US009951535B2

(12) United States Patent
Degaray et al.

(10) Patent No.: US 9,951,535 B2
(45) Date of Patent: Apr. 24, 2018

(54) SYSTEM AND PROCESS FOR MIXING AND DELIVERING BUILDING MATERIALS

(75) Inventors: Stephen Degaray, Huntington, NY (US); Peter Larsen, Farum (DK)

(73) Assignee: Pump Truck Industrial LLC, Port Washington, NY (US)

(*) Notice: Subject to any disclaimer, the term of this patent is extended or adjusted under 35 U.S.C. 154(b) by 1014 days.

(21) Appl. No.: 13/347,998

(22) Filed: Jan. 11, 2012

(65) Prior Publication Data
US 2012/0205400 A1    Aug. 16, 2012

Related U.S. Application Data

(63) Continuation of application No. PCT/US2010/041753, filed on Jul. 12, 2010, and a (Continued)

(51) Int. Cl.
B28C 7/02    (2006.01)
B28C 7/06    (2006.01)
(Continued)

(52) U.S. Cl.
CPC ............ E04G 21/04 (2013.01); B28C 5/0875 (2013.01); B28C 7/02 (2013.01); B28C 7/044 (2013.01); B28C 7/0418 (2013.01); B28C 7/0422 (2013.01); B28C 7/0454 (2013.01); B28C 9/04 (2013.01); B28C 9/0454 (2013.01)

(58) Field of Classification Search
CPC .. E04G 21/04; B28C 7/00; B28C 7/02; B28C 5/0875; B28C 9/04; B28C 7/0454; B28C 7/044; B28C 9/0454; B28C 7/0418; B28C 7/0422

USPC .... 366/14–20, 27–29, 33–35, 64–66, 37–38, 366/31–32, 50–51
See application file for complete search history.

(56) References Cited

U.S. PATENT DOCUMENTS

734,687 A    7/1903    Erter
747,652 A    12/1903    Schillinger
(Continued)

FOREIGN PATENT DOCUMENTS

EP    1669180    6/2006
JP    63-175632    7/1988
(Continued)

OTHER PUBLICATIONS

International Search Report of PCT/US2010/041753, Date of Mailing Jan. 20, 2011.
(Continued)

*Primary Examiner* — Charles E Cooley
(74) *Attorney, Agent, or Firm* — Collard & Roe, P.C.

(57) ABSTRACT

There is disclosed a system for depositing building materials comprising a motor vehicle, a container comprising a material depositing system and at least one device for removing the container from the motor vehicle. The device can comprise one or more outriggers which are adapted to remove the container from the motor vehicle and which can be used to deposit the container on a job site. In addition there is a system which includes a hydraulically controlled crane and silo doors for allowing material to be automatically added to containers for mixing building materials.

22 Claims, 16 Drawing Sheets

Related U.S. Application Data continuation-in-part of application No. 11/726,011, filed on Mar. 20, 2007, now abandoned.

(60) Provisional application No. 61/224,856, filed on Jul. 11, 2009, provisional application No. 60/743,716, filed on Mar. 23, 2006.

(51) Int. Cl.
  *B28C 9/04* (2006.01)
  *E04G 21/04* (2006.01)
  *B28C 5/08* (2006.01)
  *B28C 7/04* (2006.01)

(56) References Cited

U.S. PATENT DOCUMENTS

| | | | |
|---|---|---|---|
| 821,790 A | 5/1906 | Dorweiler | |
| 858,017 A | 6/1907 | Pence | |
| 921,480 A | 5/1909 | Stevens et al. | |
| 1,138,397 A | 5/1915 | Nesetril | |
| 1,233,198 A | 7/1917 | Davis | |
| 1,619,145 A | 3/1927 | Mcmillan | |
| 2,017,439 A | 10/1935 | Grayson | |
| 2,139,027 A | 12/1938 | Mcconnaughay | |
| 2,276,237 A | 3/1942 | Lowry | |
| 2,298,258 A | 10/1942 | Ziler | |
| 2,425,674 A | 8/1947 | Fleischmann | |
| 2,782,011 A | 2/1957 | Fitzgerald | |
| 2,929,658 A | 3/1960 | Killebrew | |
| 2,945,684 A | 7/1960 | Soldini | |
| 3,050,159 A | 8/1962 | Paulus | |
| 3,064,832 A | 11/1962 | Heltzel | |
| 3,072,388 A | 1/1963 | Ridley | |
| 3,251,484 A | 5/1966 | De P. Hagan | |
| 3,305,222 A | 2/1967 | Foster | |
| 3,343,688 A | 9/1967 | Ross | |
| 3,828,949 A | 8/1974 | Spellman | |
| 3,967,815 A | 7/1976 | Backus et al. | |
| 4,089,509 A | 5/1978 | Morton et al. | |
| 4,185,923 A | 1/1980 | Bouette et al. | |
| 4,223,996 A | 9/1980 | Mathis et al. | |
| 4,298,288 A * | 11/1981 | Weisbrod | B28C 9/0454 366/11 |
| 4,322,167 A * | 3/1982 | Hill | E01C 19/45 366/14 |
| 4,375,335 A | 3/1983 | Klein-Albenhausen | |
| 4,487,507 A | 12/1984 | Van Wyngaarden | |
| 4,506,982 A | 3/1985 | Smithers et al. | |
| 4,538,916 A | 9/1985 | Zimmerman | |
| 4,922,463 A | 5/1990 | Del Zotto et al. | |
| 5,044,819 A * | 9/1991 | Kilheffer | E01C 19/46 177/119 |
| 5,149,192 A * | 9/1992 | Hamm | B28C 9/0454 366/134 |
| 5,152,605 A | 10/1992 | Yamada et al. | |
| 5,203,628 A | 4/1993 | Hamm | |
| 5,213,414 A * | 5/1993 | Richard | B01F 7/08 366/156.2 |
| 5,570,953 A * | 11/1996 | DeWall | B28C 5/0831 366/10 |
| 5,573,333 A * | 11/1996 | Dahlman | B01F 15/00136 137/4 |
| 5,590,976 A * | 1/1997 | Kilheffer | E01C 19/46 177/119 |
| 5,624,183 A * | 4/1997 | Schuff | B01F 7/00708 366/20 |
| 5,660,465 A * | 8/1997 | Mason | B01F 7/00416 366/13 |
| 5,775,803 A * | 7/1998 | Montgomery | G05D 21/02 366/152.2 |
| 5,785,420 A * | 7/1998 | Schuff | B01F 7/00708 366/20 |
| 5,873,653 A | 2/1999 | Paetzold | |
| 5,893,639 A * | 4/1999 | Tetoldini | B28C 9/0463 366/18 |
| 6,224,250 B1 | 5/2001 | Kreinheder et al. | |
| 6,309,570 B1 | 10/2001 | Fellabaum | |
| 6,488,088 B1 * | 12/2002 | Kohli | B28C 5/4231 166/285 |
| 6,666,573 B2 | 12/2003 | Grassi | |
| 6,832,851 B1 | 12/2004 | von Wilcken | |
| 6,876,904 B2 | 4/2005 | Oberg et al. | |
| 6,929,393 B1 | 8/2005 | Brock et al. | |
| 6,955,311 B2 | 10/2005 | Moro et al. | |
| 9,738,461 B2 * | 8/2017 | DeGaray | B65G 53/40 |
| 2002/0169517 A1 | 11/2002 | Hudelmaier | |
| 2004/0176876 A1 | 9/2004 | Oberg et al. | |
| 2006/0093536 A1 | 5/2006 | Selby | |
| 2006/0201396 A1 | 9/2006 | Smith | |
| 2007/0226089 A1 * | 9/2007 | DeGaray | B28C 7/02 705/28 |
| 2007/0257392 A1 | 11/2007 | Etherton | |
| 2009/0177313 A1 * | 7/2009 | Heller | B28C 5/146 700/216 |
| 2009/0180348 A1 | 7/2009 | Long, Jr. | |
| 2010/0000442 A1 | 1/2010 | Ackerman | |
| 2012/0205400 A1 | 8/2012 | DeGaray et al. | |
| 2013/0025706 A1 * | 1/2013 | Degaray | B28C 7/0418 137/351 |
| 2013/0199617 A1 * | 8/2013 | Degaray | B65G 53/40 137/1 |
| 2016/0107132 A1 * | 4/2016 | Igo | B01F 3/1214 366/8 |
| 2016/0221220 A1 * | 8/2016 | Paige | B28C 9/0463 |
| 2017/0021529 A1 * | 1/2017 | Cunningham | B01F 15/0229 |
| 2017/0080601 A1 * | 3/2017 | Hernandez | B28C 5/386 |

FOREIGN PATENT DOCUMENTS

| | | |
|---|---|---|
| JP | 2005-213732 | 8/2005 |
| KR | 2002-0011787 A | 2/2002 |
| KR | 2003-0027532 A | 4/2003 |
| KR | 100386683 B1 | 6/2003 |
| WO | 2008115633 A1 | 9/2008 |
| WO | 2008116006 A1 | 9/2008 |
| WO | 2011008716 A2 | 1/2011 |
| WO | 2013012984 A2 | 1/2013 |

OTHER PUBLICATIONS

International Preliminary Report on Patentability, dated Sep. 22, 2009 in PCT/US2008/053519, 5 pages.
International Preliminary Report on Patentability, dated Sep. 22, 2009 in PCT/US2008/057528, 6 pages.
International Preliminary Report on Patentabilty for PCT/US2012/047295 mailed Jan. 21, 2014, 9 pages.
Written Opinion of the International Searching Authority for PCT/US2012/047295, mailed Jan. 29, 2013, 8 pages.
Canadian Office Action in Canadian Application No. 2,767,762 dated Apr. 12, 2016.

* cited by examiner

SYSTEM AND PROCESS FOR MIXING AND DELIVERING BUILDING MATERIALS

CROSS REFERENCE TO RELATED APPLICATIONS

This application is continuation application of PCT/US2010/041753 Filed on Jul. 12, 2010 now expired which is a non-provisional application and hereby claims priority from U.S. Provisional Patent Application Ser. No. 61/224,856 filed on Jul. 11, 2009. This application is a continuation in part application of U.S. patent application Ser. No. 11/726,011 filed on Mar. 20, 2007 (now abandoned) Which is a non-provisional application that claims priority from provisional application Ser. No. 60/743,716 filed on Mar. 23, 2006 the disclosure of all of these applications in are hereby incorporated herein by reference in their entirety.

BACKGROUND

One embodiment of the invention relates to a system and process for delivering building materials to a building site.

SUMMARY

One embodiment of the invention relates to a system and a process for delivering building materials to a building site. The building materials can be selected from the group comprising or consisting of concrete, asphalt, mineral fibers, or other known paving materials. The system for distributing this material can comprise at least one silo, at least one pump, at least one crane, and at least one distribution hose. Coupled to this distribution system can be a remote pump or stage pump which can be used to further assist in distributing the materials. If one silo is used, the material which can comprise concrete can include a premixed selection of binder, limestone silica, non Portland cement based cementitious underlayment compound. These components can include anyone of calcium aluminate cement, fly ash, aggregate, polymer, and superplasticizer. Alternatively, Portland cement and/or gypsum can be combined with anyone of the above materials as well. These components are then distributed to form a surface. This surface results in an installed underlayment that is receptive and functionally compatible with a large number of water-based adhesives that are used to attach the vinyl flooring, wood flooring, ceramic tile, and other coverings to the underlayment. This underlayment creates an environmentally friendly work place by reducing the disposal of packaging. This installation results in a LEED certified product. It is environmentally conscious because it employs fly ash as a primary pozzolan—which represents low energy consumption for cementitious compositions. This installation results in reducing the occupational safety hazards of working around airborne dust. In addition, another beneficial result is that it results in increasing the speed and efficiency of construction with high volume installation by means of highly sophisticated equipment that has production capabilities such as at a rate of 20 tons per hour. Another benefit results in reducing the cost of construction by ultimately offering the owner and general contractor a savings over the total cost of traditional underlayment installations and concrete finishing methods.

Another benefit is that other trades are allowed easy access to the concrete floor and the ability to put that area back in service as soon as possible, typically as soon as 24 hours. The method utilizes a high-solids styrene acrylic polymer primer that penetrates the surface of the concrete slab floor, and acts as an adhesive intermediary between the new material and the concrete slab, thus maximizing the adhesion of the cementitious composition to the slab, reducing the water loss from the cementitious underlayment composition due to the porosity of the concrete substrate, which in turn increases the compressive strength of the composition. The method incorporates pumping the fluid mixture onto the previously surveyed concrete slab floor using the newly established benchmarks to level the floor, then smoothing the surface, and curing it to a minimum of strength such as up to 4,000 PSI. This material forms a permanent alkali barrier to the concrete it is installed over, even when the concrete has a pH of less than or equal to 13. The underlayment composition material can also be installed when the concrete has an RH value of less than or equal to 95%. The concrete surface does not have to be profiled or prepared using mechanical shot blast or grinding equipment prior to installation and the method ensures the ability to achieve the concrete floor engineering or architectural specification.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION

Figure 1:
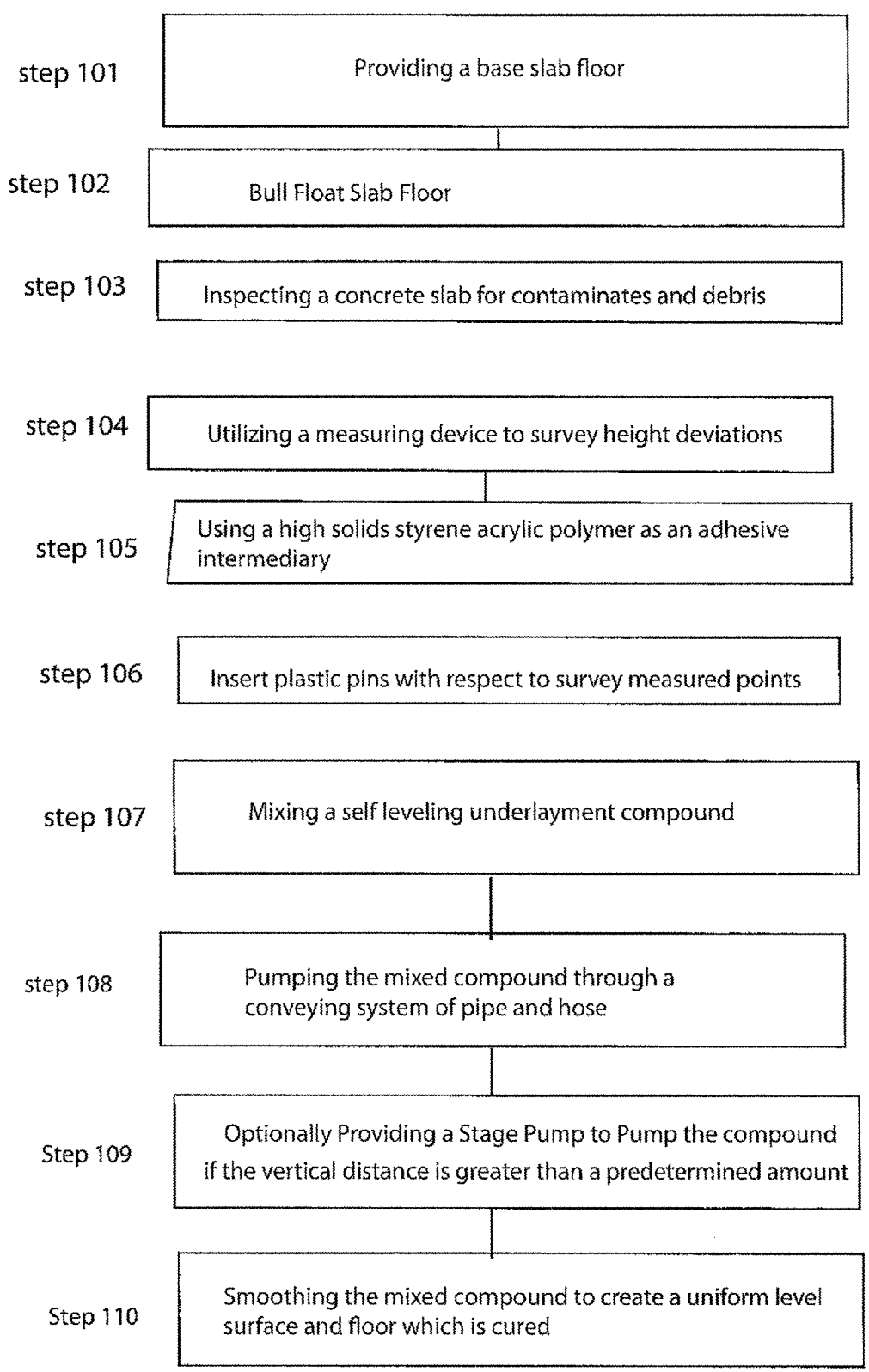
FIG. 1 is a flow chart for an example of a process for distributing building materials for providing a floor.

Turning now in detail to the drawings, FIG. 1 shows a flow chart for a process which includes step 101 which involves providing a base sub floor of concrete. In this step, the base sub floor is provided so that it is provided at a level approximately ½ to ¾ below a normal finished sub floor, Step 102 includes preliminarily finishing the sub floor such as by bull floating the slab floor. Step 103 involves inspecting the existing concrete slab for contaminates and debris, but eliminating the need for shotblasting or grinding, unless limited grinding of high spots will reduce the overall material cost. The next step 104 involves utilizing a measuring device to survey height deviations between a reference point in a concrete slab and the respective measuring points that are marked with self-adhering plastic pins for defining the new finished sub-floor height by resetting the benchmarks off of actual slab conditions.

The next step 105 involves using a high-solids styrene acrylic polymer primer as an adhesive intermediary to penetrate the surface of the concrete slab floor, and then maximizing the adhesion of the cementitious composition. Once the primer is placed on the sub floor, in step 106, pins such as plastic pins are placed on the sub floor. The placement of these pins are with respect to survey measured points. Once the pins are placed down, the next step 107 involves mixing a self leveling underlayment compound using a computer remote controlled, single or dual silo, self contained, mobile blending unit, capable of precisely weighing and mixing, an engineered hydratable cementitious composition, aggregate, and water, into a uniformly consistent highly fluid mixture. This mixing can be in a continuous process or via a batch mixing process wherein the material is mixed and then dumped into an intermediate holding container, which then allows the material to be continuously fed. With this type of batch mixing, output is always equal to input, and each batch can consist of approximately 400 liters. While the 400 liter amount is given above, any suitable range can be used using a suitable batch mixer. Thorough mixing is accomplished in a very short time by applying high-shear, high-energy mixing to the engineered chemistry and binder system of concrete composite. Once the material has been mixed, the mixer pivots up to allow access to the material reservoir below typically during clean-out. When the mixer is in the up position, the entire pumping process will not operate.

The next step 108 involves hydraulically pumping the mixed compound through a conveying system of pipe and hose. Step 109 involves optionally providing a secondary progressive cavity pump (stage pump), controlled by wireless radio remote by the on-board software of the mobile blending unit, to a previously surveyed concrete slab floor to the predetermined survey benchmarks and specified thickness. In this case, the stage pump can be placed depending on a predetermined vertical distance such as 300 feet or depending on the power of the base pump, up to 500 feet or more.

The next step 110 involves smoothing the mixed compound to create a uniform and level surface and floor, which when cured, will form a permanent alkali barrier to the concrete it is installed over and eliminating the need for concrete finishing by means of power-troweling. This surface results in an installed underlayment that is receptive and functionally compatible with a large number of water-based adhesives that are used to attach the vinyl flooring, wood flooring, ceramic tile, and other coverings to the underlayment.

This underlayment creates an environmentally friendly work place by reducing the disposal of packaging. This installation results in a LEED certified product, and being environmentally conscious by using fly ash as a primary pozzolan—which represents low energy consumption for cementitious compositions. This installation results in reducing the occupational safety hazards of working around airborne dust. In addition, another beneficial result is that it results in increasing the speed and efficiency of construction with high volume installation by means of highly sophisticated equipment that has production capabilities of 20 tons per hour. Another benefit results in reducing the cost of construction by ultimately offering the owner and general contractor a savings over the total cost of traditional underlayment installations and concrete finishing methods. Another benefit is that it allows other trades easy access to the concrete floor and the ability to put that area back in service as soon as possible, typically as soon as 24 hours.

The method can also utilize a high-solids styrene acrylic polymer primer that penetrates the surface of the concrete slab floor, acts as an adhesive intermediary between the new material and the concrete slab, thus maximizing the adhesion of the cementitious composition to the slab, reducing the water loss from the cementitious underlayment composition due to the porosity of the concrete substrate, which in turn increases the compressive strength of the composition. The method incorporates pumping the fluid mixture onto the previously surveyed concrete slab floor using the newly established benchmarks to level the floor, then smoothing the surface, and curing to it a minimum of 4,000 PSI. This material forms a permanent alkali barrier to the concrete it is installed over, even when the concrete has a pH of less than or equal to 13. The underlayment composition material can also be installed when the concrete has an RH value of less than or equal to 95%. The concrete surface does not have to be profiled or prepared using mechanical shot blast or grinding equipment prior to installation and the method ensures the ability to achieve the concrete floor engineering or architectural specification. While the above process can be implemented using any type system. However, FIGS. 2-10 disclose an example of one system which can be used to perform the above steps.

Figure 2:
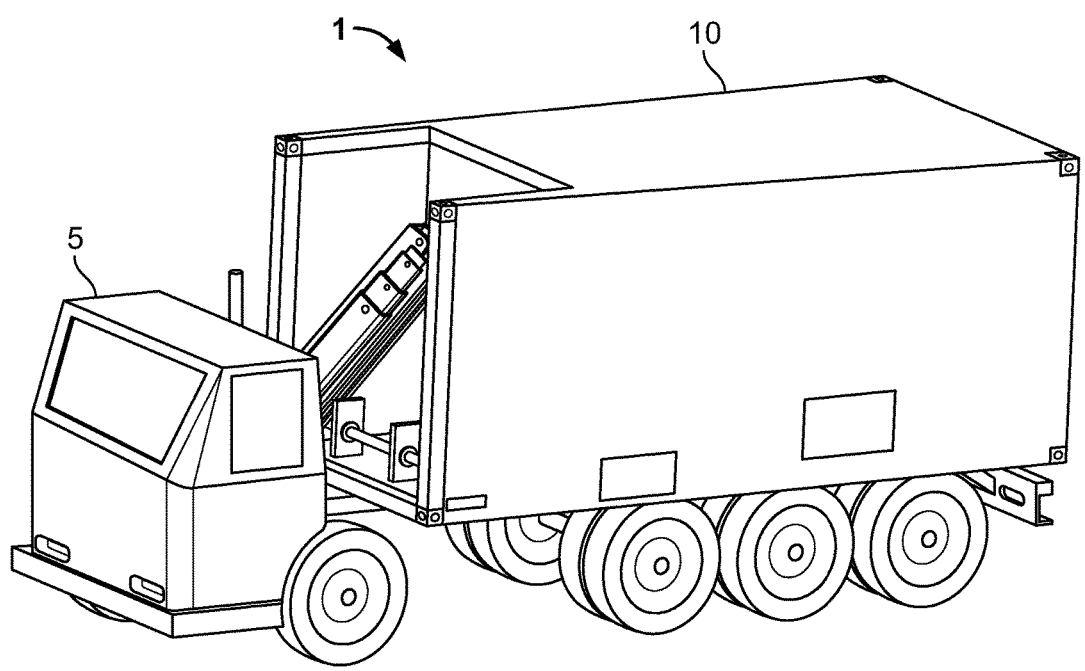
FIG. 2 is a perspective view of a first embodiment.

FIG. 2 discloses an overall view of one example embodiment 1 which includes a cab 5, and a container 10 which is coupled to the cab 5. Inside or coupled to the container, there are the following optional components: 1) outriggers 20 (See FIG. 7); 2) loading crane 30 (See FIG. 3); 3) remote control for crane 95 (See FIG. 14); 4) aggregate chamber 40 (See FIG. 13); 5) binder chamber 50 (See FIG. 13); 6) water tank (See FIG. 13); 7) heating power pack 73 (See FIG. 13); 8) a mixing and pumping unit 60 (See FIG. 13); 9) a mortar hose reel 66; 10) a water tank 70 (See FIG. 13); 11) a water pump 72 (See FIG. 13); 12) a water hose reel 74; 12) an electronic control panel 90 (See FIG. 15); 13) a user remote control 95 (See FIG. 16); 14) a printer port/printer 98 (See FIG. 16); 15) water connection 71 (See FIG. 13), Other optional features include a 16) generator 65 See FIG. 15; (also see generators 210, 220 in FIG. 17); 17) chemical additive pump for supplying liquid additives 80 (See FIG. 10); 18) A stage pump 99 (See FIG. 15); 19) a water flow meter 64.2 (See FIG. 15); 20) at least one or a plurality of displays 91 (See FIG. 16). The generator can be used to generate electrical power if electrical connections to a building under construction are not available.

This chemical additive pump 80 doses in a particular amount of additional chemicals into the mixed concrete or building components. This chemical additive can be used to control the physical or chemical properties or performance parameters of the mixing building materials in the mixing hopper 49.

Figure 3:
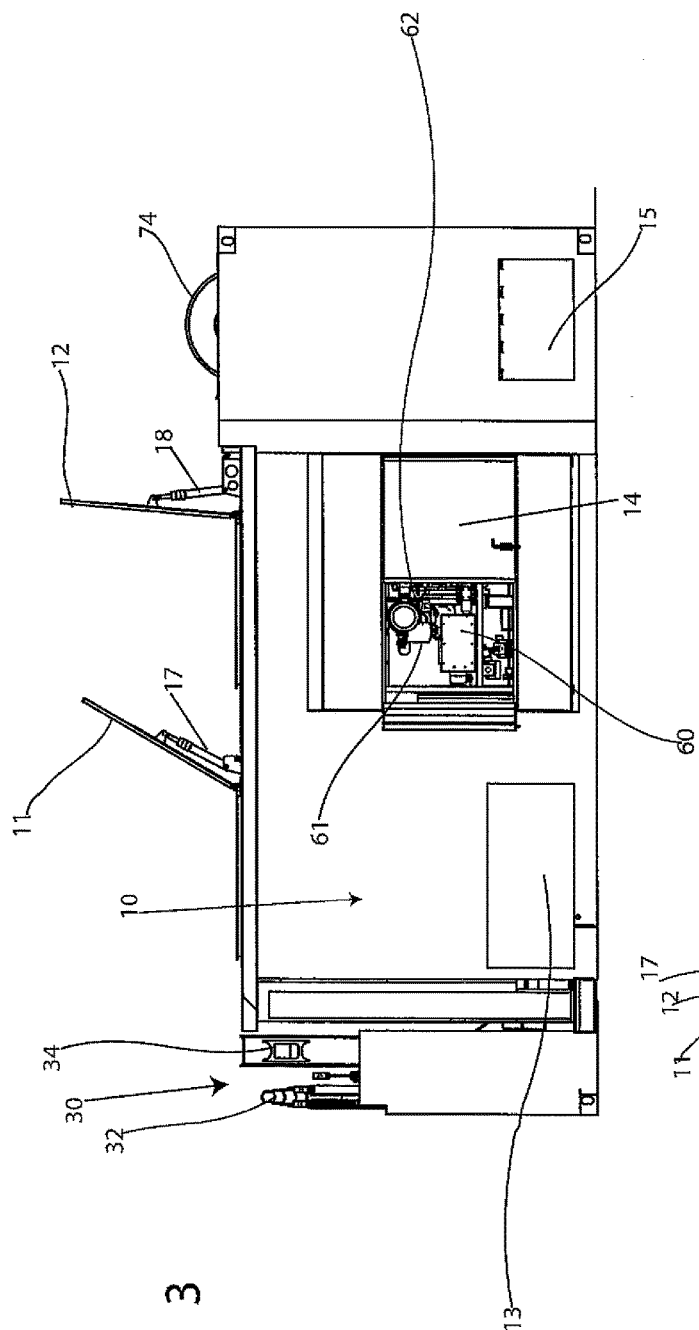
FIG. 3 is a side view of the embodiment shown in FIG. 2.
Figure 4B:
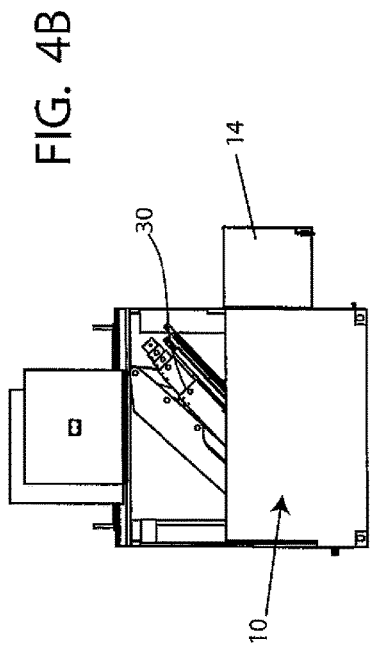
FIG. 4B is a right side view of the embodiment shown in FIG. 3 which is the view from the front of the container.
Figure 4A:
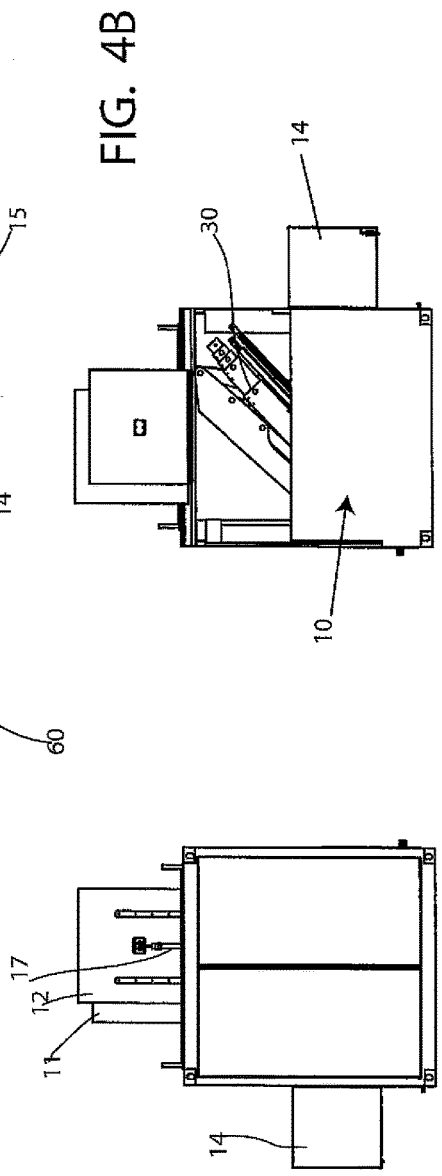
FIG. 4A is a left side view of the embodiment shown in FIG. 5, which is the view from a back of the truck.

FIG. 3 shows a side view of the container while FIGS. 4A and 4B show end views of these containers. The container 10 can be of any suitable size and can be for example at least 6 meters long, 2.4 meters wide and approximately at least 2.5 meters high. The height with the outriggers can be even at least 4 meters high. The net weight can be approximately 11,000 kilograms unloaded with the maximum gross weight of 28,100 kilograms including payload. The container can include top hatches 11 and 12 as well as side hatches 13, 14, and 15. Each of these hatches can be opened by a hydraulic lift or cylinder 17 or 18.

The loading crane 30 can carry approximately 2 tons with a pivoting radius of approximately 4 meters or 1 ton with a radius of approximately 6 meters. The loading crane can be essentially a two knuckle or even a three knuckle three part crane. Crane 30 can have a remote control 95 (See FIG. 15) connected to it which can be used to turn the crane, lift the crane, fold the crane, telescope the crane, open/close the lid for a binder chamber, open/close the lid for the aggregate chamber, and to extend, retract and raise/lower the functions of the telescoping outriggers 20 (See FIG. 7). This remote control allows for the switching over from the crane to the outriggers. In addition, as discussed below, this remote control can be in the form of a wireless remote control that is configured to control and monitor the entire operation of the pump.

Figure 6:
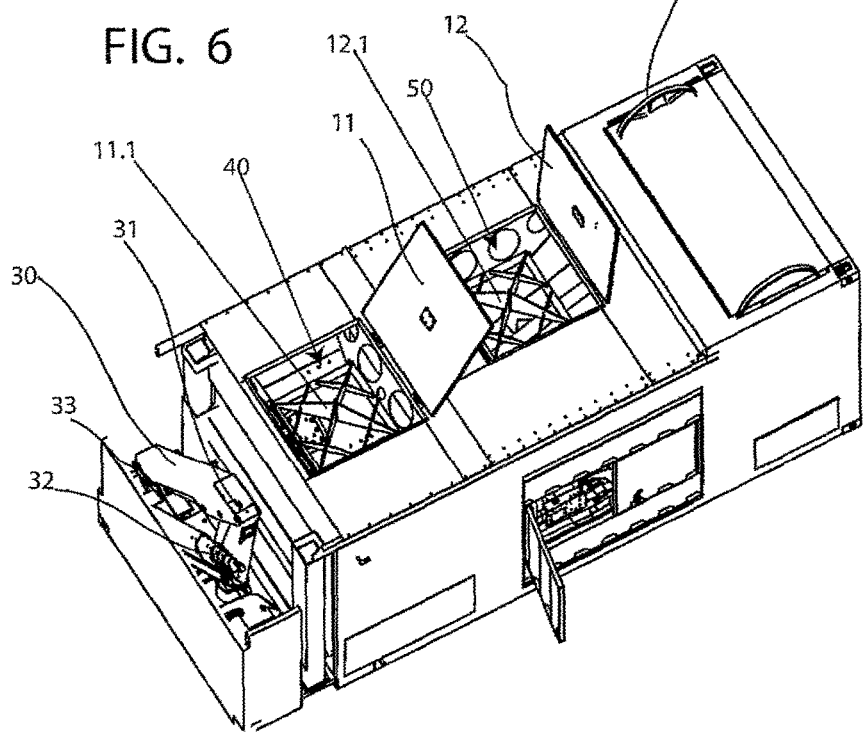
FIG. 6 is a perspective view of the embodiment shown in FIG. 1.

The crane can include a base arm 31, a secondary arm 33 and a telescoping arm 32, and different knuckles such as knuckles 31 and 33 See FIG. 6. This crane can be used to insert material such as binder or sand into the binder containers by opening hatches 11 and 12, thereby opening containers 40 and 50. Each of these containers includes grates, or slicers 11.1 and 12.1 used to cut open bags lifted over the containers by crane 30.

Figure 5:
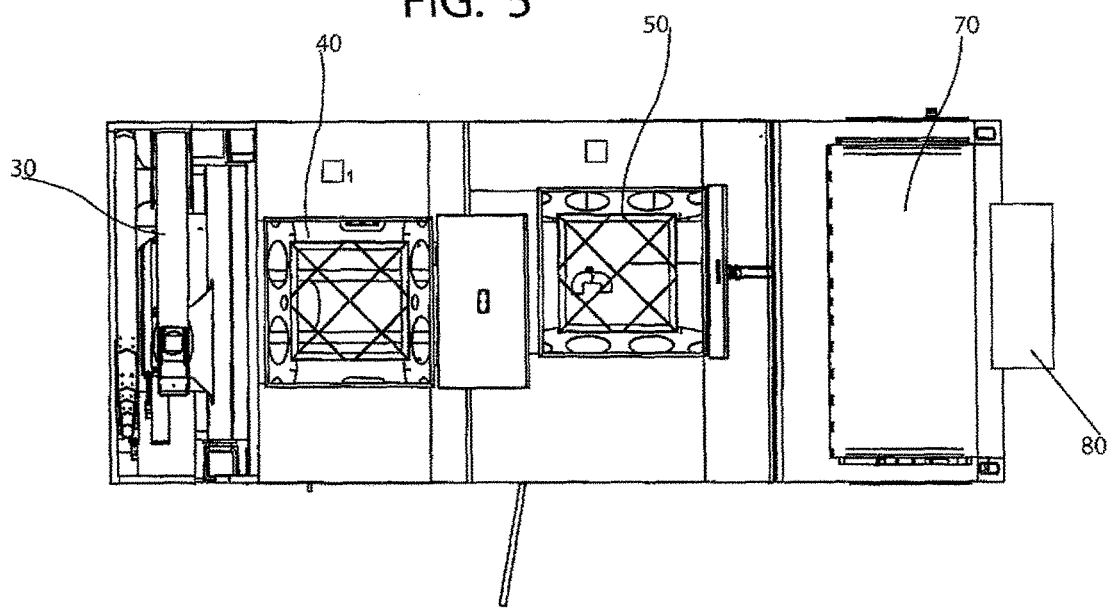
FIG. 5 is a top view of the container.

As shown in FIG. 5, the aggregate chamber or silo 40 is disposed inside of the container and it can be of any appropriate size but in at least one example has a gross volume of at least 5 cubic meters. The aggregate chamber is essentially a hopper which can be of any shape but in this case is in substantially rectangular form and fitted with a vibration mechanism such as a vibrating base 42 (See FIG. 8) to achieve a low center of gravity for the unit as well as to maximize its useable volume. The vibrating base 42 transports the aggregate material towards the discharge outlet by means of hydraulically driven vibration motors. A hydraulically driven screw drive belt 48 (See FIG. 12) located below the discharge outlet (not shown) then doses the aggregate material into the mixing hopper 49 (See FIG. 9). The hopper 49 can be accessed and refilled during screed production through a roof-mounted hatch which can be opened and closed hydraulically. The open/close mechanism is controlled via the crane's remote control.

There is also a binder chamber or silo 50 with a gross volume of approx. 4 m; The slanted built chamber is designed to allow the binder to slide down towards the lower lying discharge outlet. A hydraulically driven worm pump system 57 (See FIG. 8), located below the discharge outlet then doses the binder into the mixing hopper 49 (See FIG. 9). Mixing hopper 49 can be accessed and refilled during screed production through a roof mounted hatch which can be opened and closed hydraulically. The open/close mechanism is activated via the crane's remote control.

Figure 7:
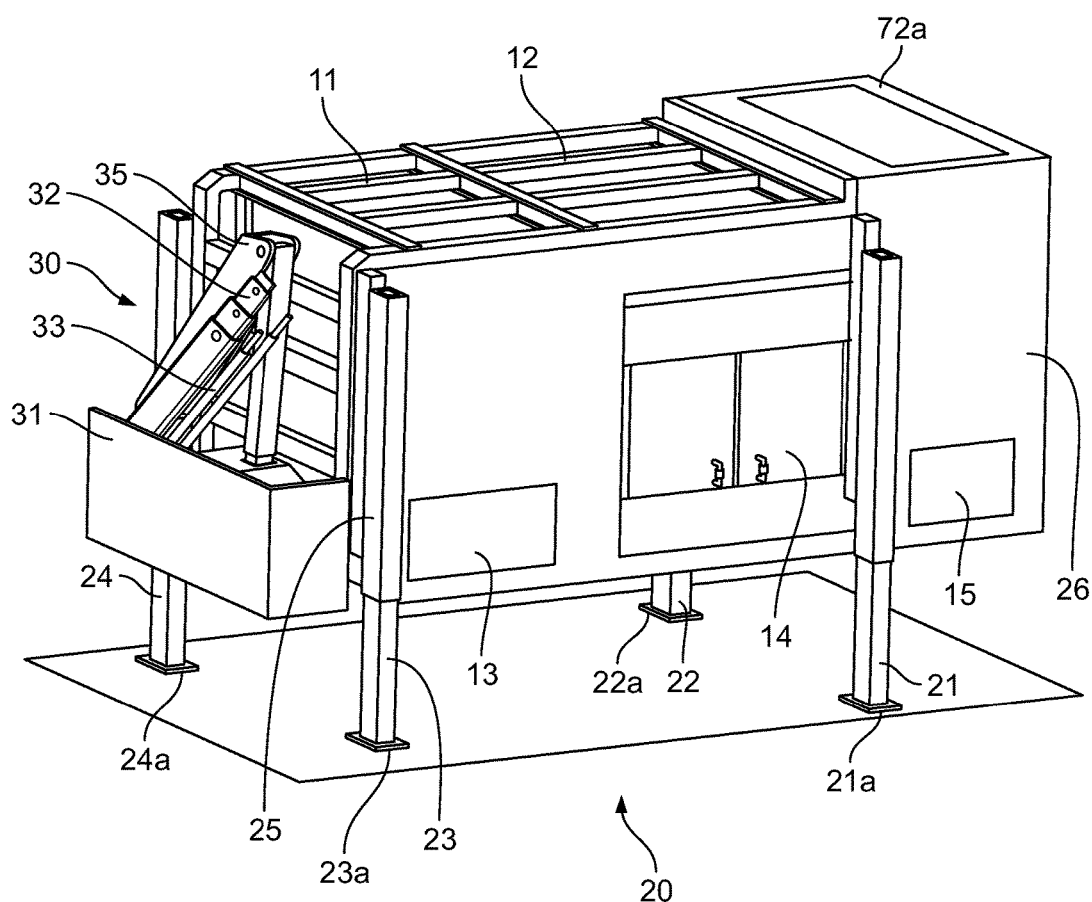
FIG. 7 is a perspective view of the device disposed on outriggers.
Figure 8:
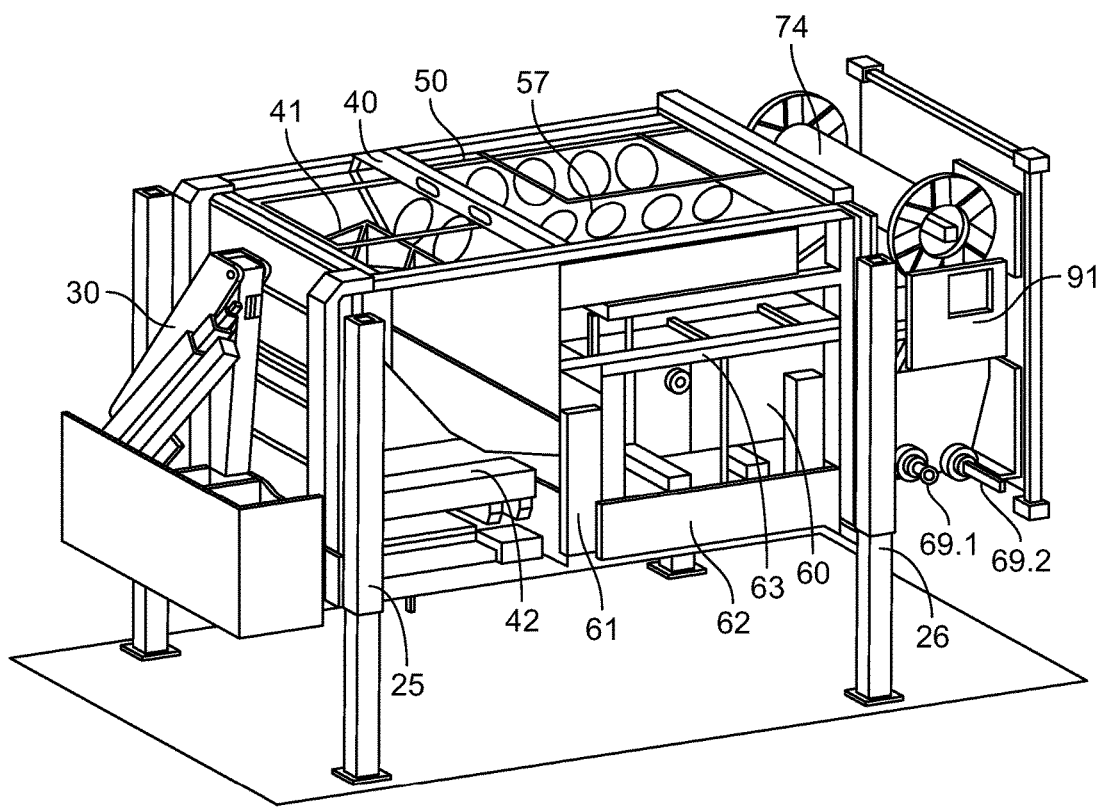
FIG. 8 is a perspective cut away view of the device shown in FIG. 7.

As shown in FIGS. 7 and 8, there are also outriggers 20, which can comprise one stilt or a plurality of outriggers such as four outriggers 21, 22, 23, and 24, These outriggers can be hydraulically controlled by control panel 90 and retracted into a stilt housing 25 or 26. Each of these stilts contains at least one pivotable foot 21a, 22a, 23a, and 24a, which can be coupled to each outrigger via a universal joint. As stated above, the cab can be removed from the container and can be used to selectively move the container from job site to job site. The outrigger columns can be extended up and down and be used to set the container off of the cab in a stand alone position.

FIG. 8 shows a side cut-away view which shows crane 30, along with aggregate silo 40 having a cutting top 41 which includes a screen disposed on top. In this case, when bags are lifted off of the dispensing truck, they are cut open using the cutting top and then the aggregate material is dumped into the aggregate silo. Also as shown in this view the vibrating bottom 42 is shown beneath the aggregate silo which keeps the material from forming clumps. Disposed adjacent to the aggregate silo 40, is the binder silo 50. This binder silo 50 has a cutting top 57 and screen which performs the same function as cutting top 41.

In addition disposed adjacent to the binder silo 50 is the hydraulic system 60. Hydraulic system 60 can be in the form of a diesel generated system which pumps oil through the system. Adjacent to the hydraulic system 60 is a hydraulic oil tank 61 which allows fluid to flow through the system. In addition, there is a diesel oil tank 62 disposed adjacent to hydraulic pumping system 60, this diesel oil tank provides diesel oil to provide power to the hydraulic pumping system 60. In addition, there is a valve system 63 disposed above the pumping system 60 which allows different hydraulic tubes to be activated. This view also shows paddle mixer 69.1 and screw drive 69.2 which drive the material out from the material container 51. This view also shows the LED screen 91 for control panel 90. (See FIG. 15).

Figure 9:
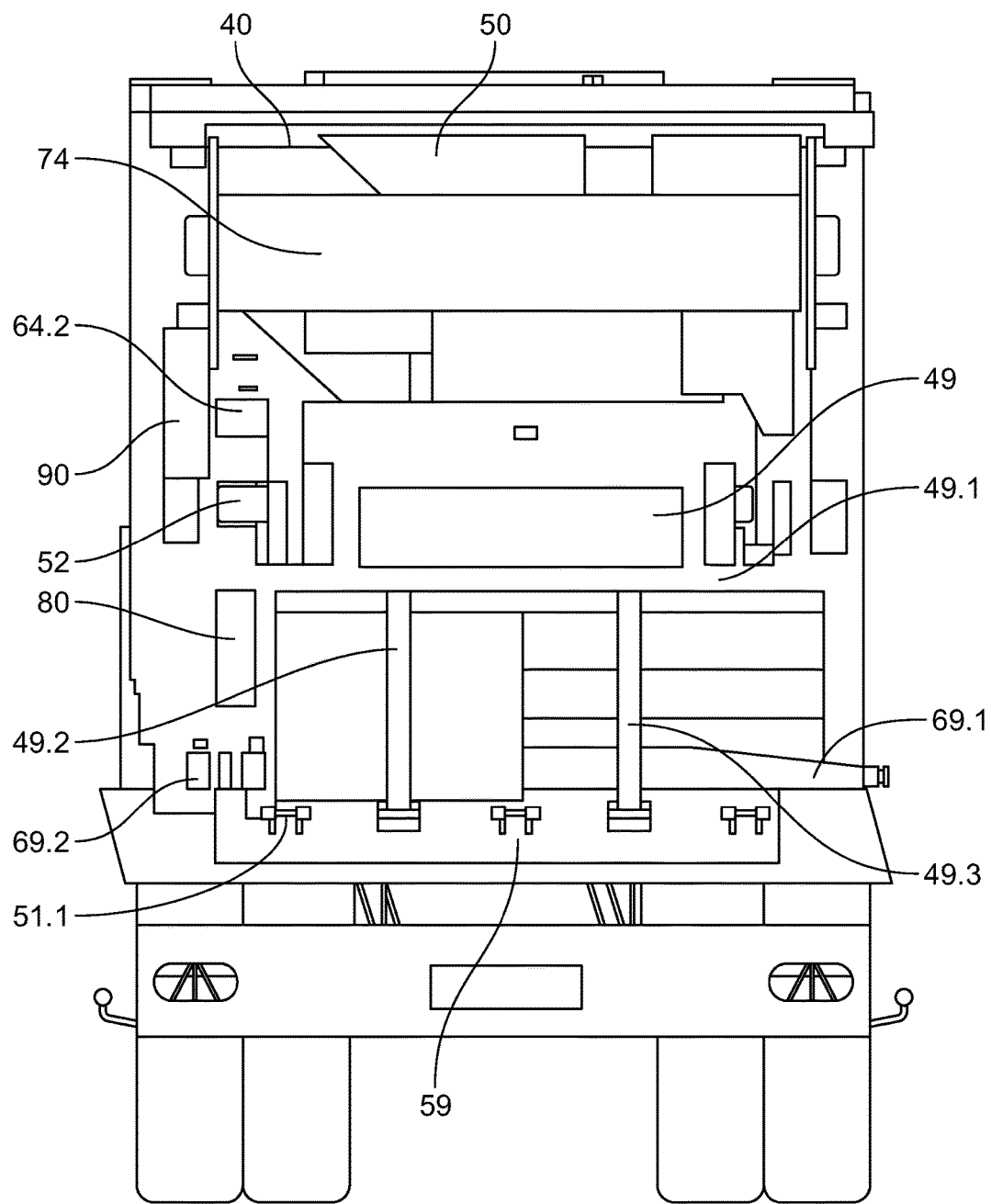
FIG. 9 is a back view of the device disposed on the truck.

FIG. 9 shows a back side view of the container including aggregate silo 40, binder silo 50, material hose reel 74, water flow measuring valve 64.2, and control panel 90. Mixing container 49 is disposed adjacent to material container or reservoir 51, wherein mixing container 49 is mixed via a mixing unit 55 which can be in the form of a paddle mixer. Hydraulic lifts 49.2 and 49.3 are used to raise and lower the mixing container to make it easier to clean or to dump material into material reservoir 51 (See FIG. 10).

Figure 10:
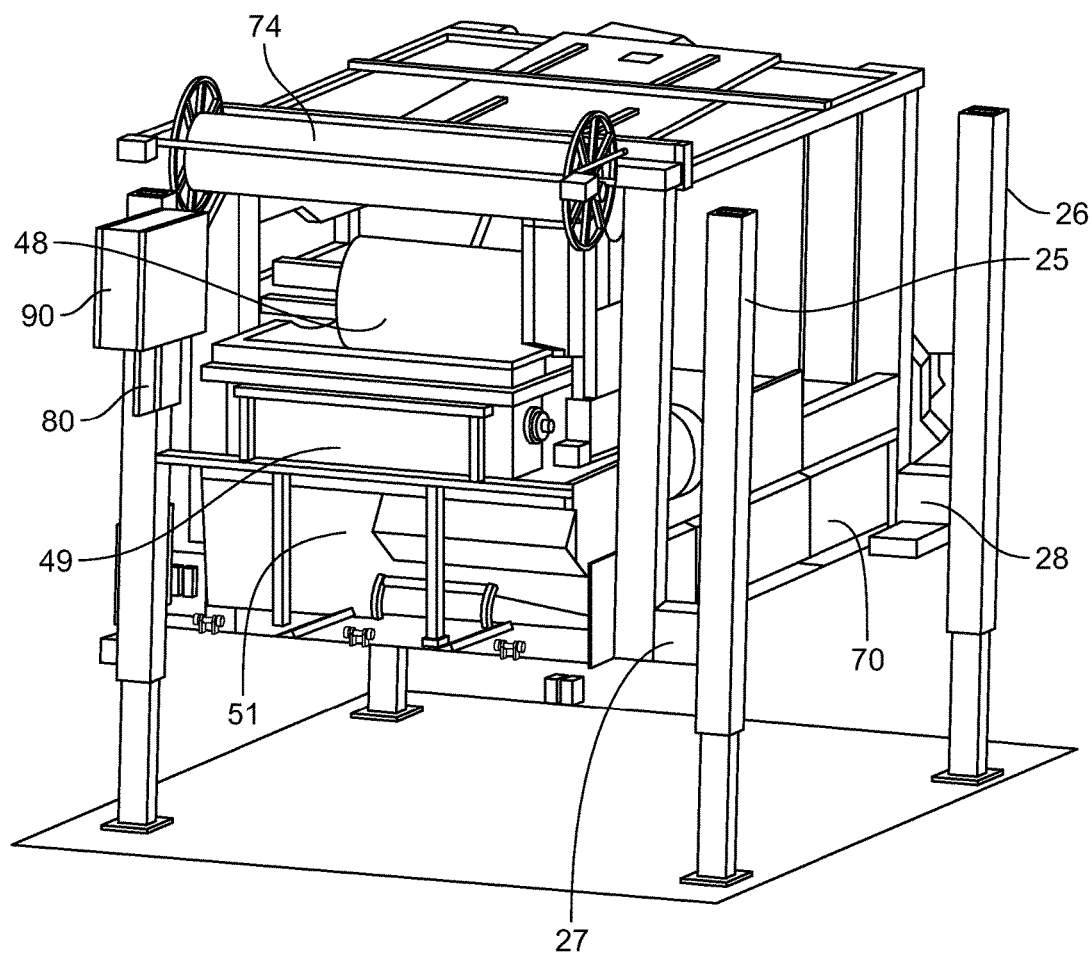
FIG. 10 is a back side perspective view of the truck.

FIG. 10 shows a hack perspective view which also shows a water tank 70 with a gross volume of approx. 700 liters, and which is heatable. Water is dosed by means of a water pump 72, (FIG. 13) using a water meter, through an isolated pipe 75 (See FIG. 15) into the mixing hopper.

Figure 11:
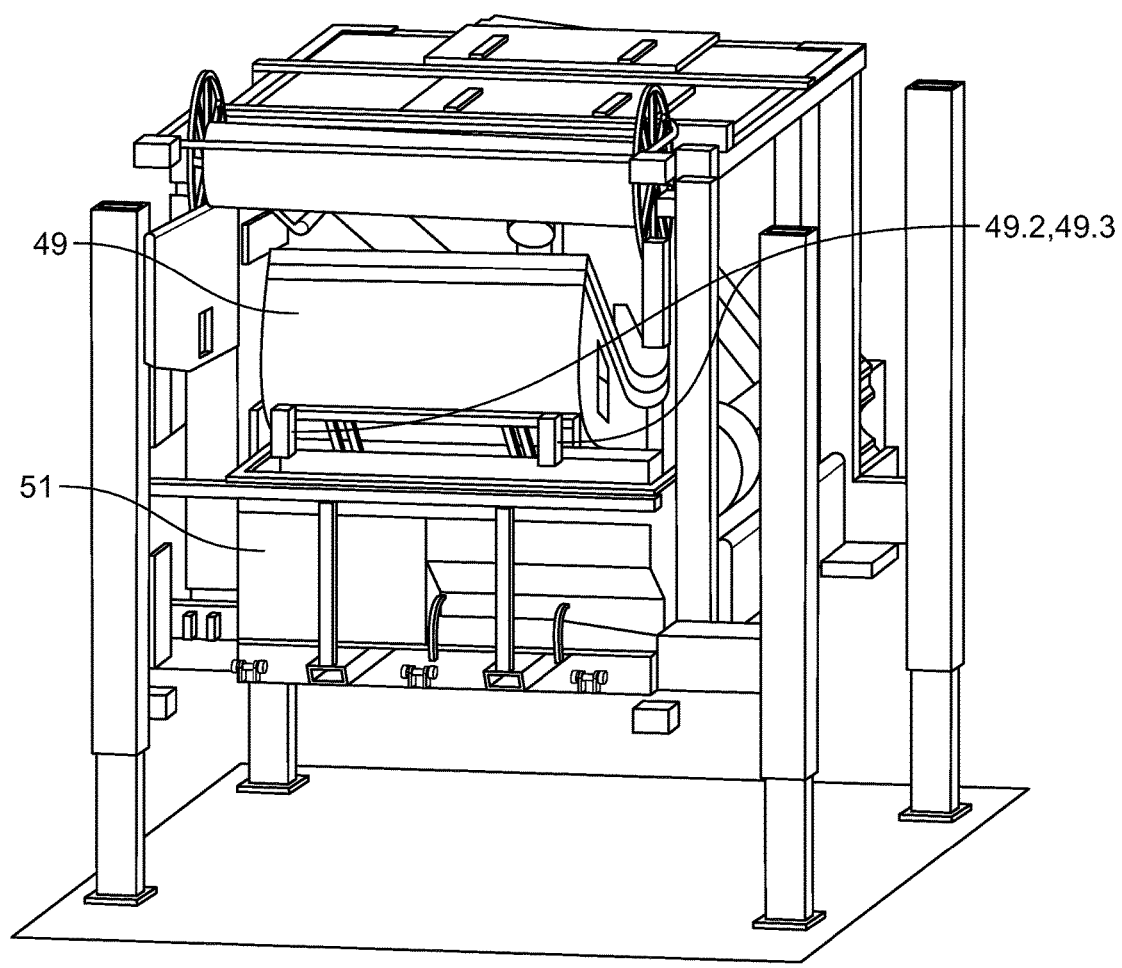
FIG. 11 shows a back side perspective view of the truck with the mixer in an elevated position.
Figure 12:
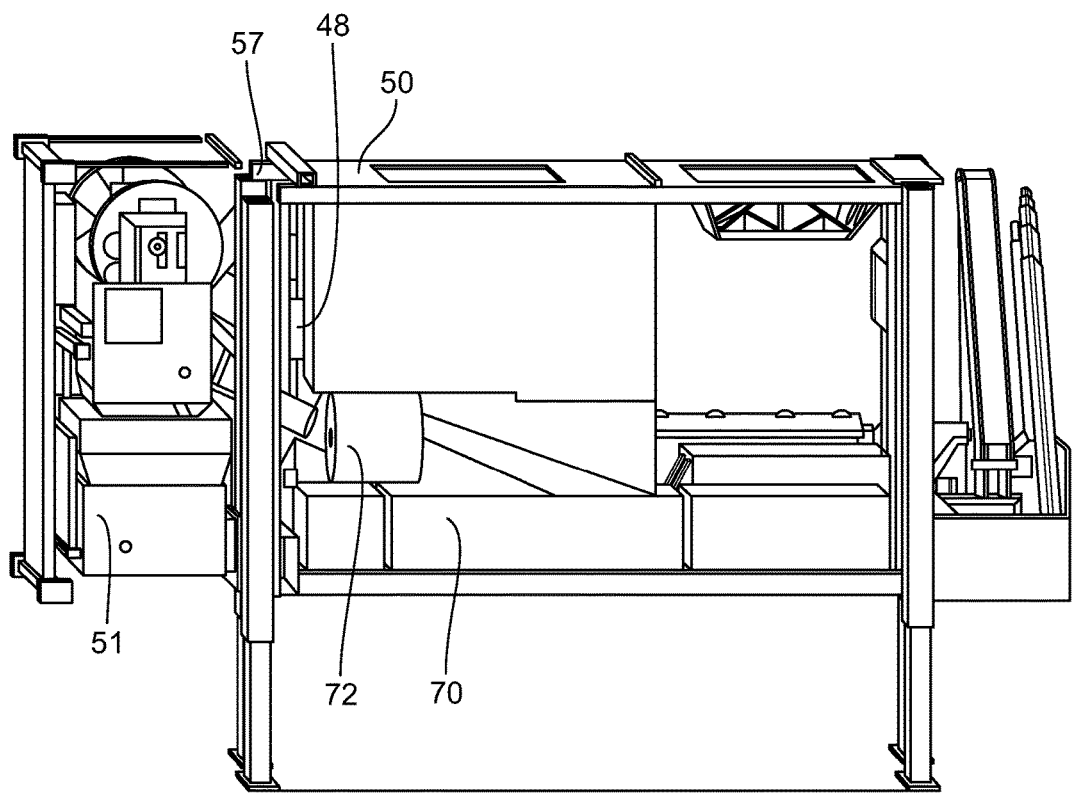
FIG. 12 shows a side cut-away view of the truck.

FIG. 11 shows a back perspective view, while FIG. 12 shows a side cut-away view of the container. In this view mixing container 49 is shown above material reservoir 51 and elevated by adjustable hydraulic cylinders which are controlled by control panel 90. FIG. 12 shows the side view, which shows the binder feed tube 57 having a screw drive disposed inside to feed material into mixing hopper 49. This view also shows water tank 70, as well as aggregate feed tube 48.

The water can be heated with a heating unit 73 (FIG. 13) and have a heating power of approximately 3.0 KW. The heating unit comprises a power pack with motor hydraulics unit as well as tanks for fuel and hydraulic fluid.

Figure 13:
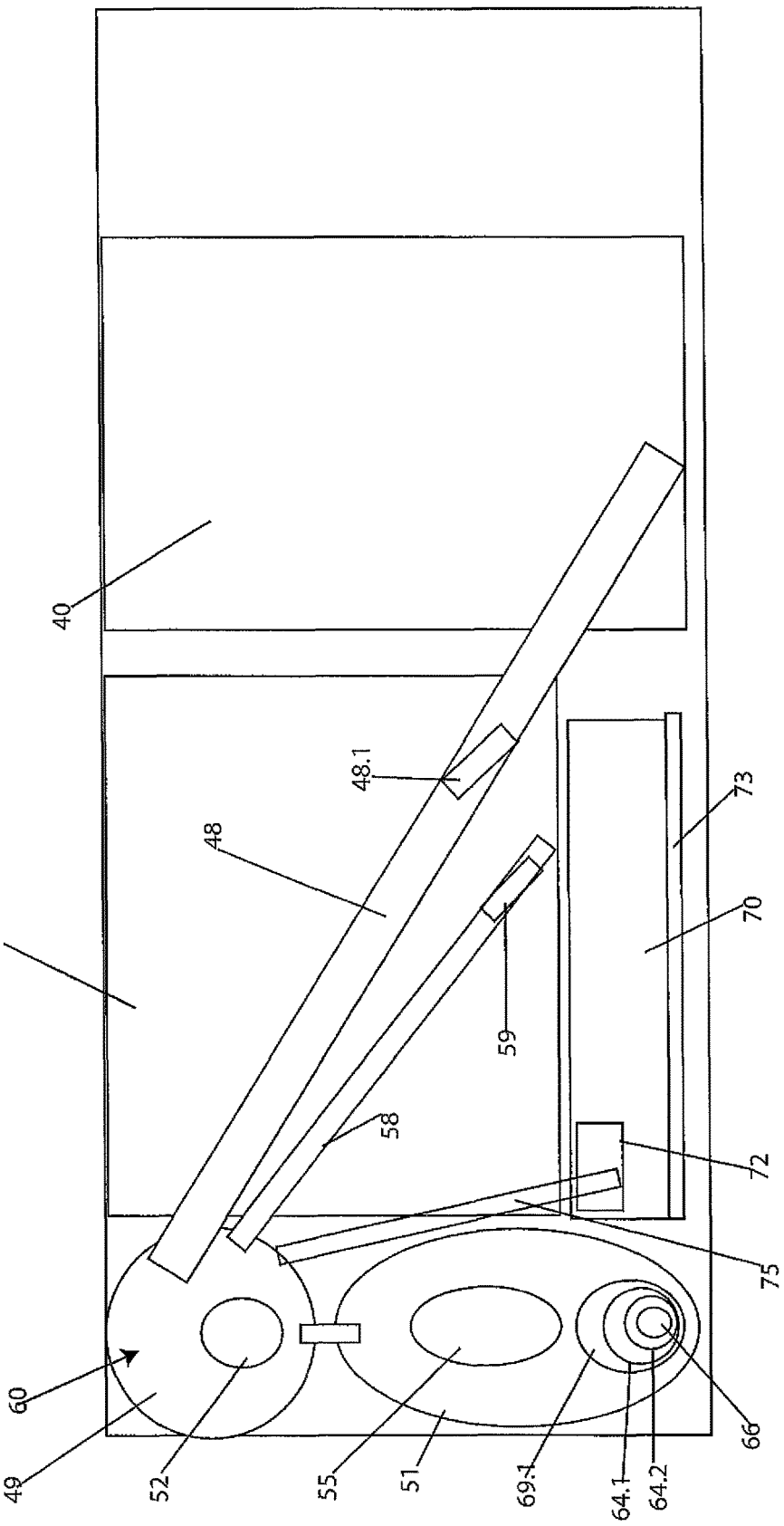
FIG. 13 is a side block diagram of the feeding system in the truck.

FIG. 13 shows a side cut-away view of the truck system which includes the aggregate silo 40, the binder silo 50 and a feed tube 48 which has a screw drive disposed therein, which drives aggregate from aggregate silo 40 into mixer hopper 49. In addition, a feed tube 58 also feeds binder from binder silo 50 into mixer hopper 49. These materials are then weighed using weighing bridges 49.1 which communicate the weight of the batch back to the computer. Water is also pumped into mixer hopper 49 in a regulated manner using control panel 90 which monitors the amount of water being added vs. the weight of the dry mixture of binder and aggregate. The flow meter 64.2 measures the amount of water that is added from water tank 70 to the mix. In this case, water is pumped from water tank 70 via water pump 72 through piping 75 to mixer hopper 49. As stated above, this water tank can be kept heated via heating unit 73 which keeps the water from freezing inside of the water tank even on relatively cold days. Once the solution is fully mixed, it is fed as a batch into the material reservoir 51. The material reservoir can be of any suitable size but in many cases is larger than the mixer hopper 49, which allows for more than one batch from the mixer hopper 49 to be added into material reservoir 51 before the material is fully distributed.

The engine or built-in motor (oil and water-cooled) is fitted with hydraulic variable displacement and geared pumps.

Once the binder material from the binder hopper 50, the aggregate material from the aggregate hopper 40 and the water are inserted in to the system, they are combined in a mixing unit or chamber 49. A mixing and weighing hopper 49 rests on at least one or a plurality of weighing bridges 49.1. (See FIG. 9) The mixing and weighing hopper or drum 49 can hold any necessary volume but in this example holds a volume of approx. 400 liters and can be raised by means of at least one or more hydraulic cylinders 49.2 and 49.3 such as two hydraulic cylinders for cleaning purposes. Once raised, this also allows easier access for cleaning of the delivery hopper, which is located beneath the mixing and weighing hopper. The materials inside of the mixing unit are mixed via a paddle mixer 55, which churns the material inside of the mixer around. This composite material is then mixed with the paddle mixer 55 to produce a slurry. Before the water is even mixed in, the components inside of the mixing and weighing hopper 49 are weighed by weighing bridges 49.1. To match the materials with the appropriate amount of water, a flowmeter is used to gauge the amount of water that is added to the dry mix. Once all of the materials have been added, then it is continuously mixed as a batch mix before it is then later added into the material reservoir 51.

Once the material is mixed it is inserted into the material reservoir 51. Inside of the material reservoir is also include a shut off valve 67 and a high/low sensor 115/116 which is used to determine the level of the components in the mixing unit, a flow meter 64.2 or volume meter 64.1. An optional stage pump 99 (FIG. 15) can also be connected to the control unit 90. Inside of this mixing unit the material such as the aggregate and binder is mixed with water.

Thus, there is also a delivery hopper or material reservoir 51 disposed below the mixing and weighing hopper 49 and which can be of any necessary size but in this example has a volume of approx. 900 liters and as such, enables continuous material delivery. The delivery hopper contains a hydraulically driven paddle mixer 55 that ensures continuous mixing of materials to prevent them from settling even when the delivery worm pump 69.1 is turned off. The components of the aggregate silo and the binder silo can be mixed with water or other liquid material to form the composite slurry which would ultimately be used to provide flooring such as concrete flooring. Truck material reservoir is mounted below the mixing vessel. This reservoir is capable of holding ~2-2.5 batches of concrete composite, allowing continuous pumping during batch mixing. There is a secondary high-speed mixing paddle inside of the reservoir that maintains the homogeneity of the concrete composite if production is slowed down or pumping is delayed. This secondary mixing paddle also helps to push material toward another feed auger that is connected to the progressive cavity (rotor stator) pump.

Thus the rotor stator pump which is disposed below the material reservoir receives this material and pumps this material through the associated hose or hoses. The rotor stator pump 69.1 is then driven by the pump or hydraulic motor 60 which drives this pump. This pump is a high-pressure, high-output progressive cavity (rotor stator) pump that is designed for concrete composite underlayment. This pump will generate sufficient force to pump vertically up to at least approximately 35 stories from ground level. The pump is a positive displacement pump. The rotor and the stator are two of the construction elements of this type of pump. The stator consists of two spirals while the rotor has only one spiral. The rotor is made of carbon steel. The rotor rotates creating sealed spaces between the rotor and stator. New spaces/cavities are created when the rotor is turning that move axial from the suction side towards the pressure side. The suction side and the pressure side are always sealed off; and a continuous flow of concrete composite is created. The material exits the pump into reducer or rubber hose and is conveyed hydraulically, under pressure to the point of placement. The rotor stator assembly requires adjustment to accommodate normal wear. These adjustments must be made by a trained and experienced operator. The entire rotor stator assembly should be replaced as a complete unit, when the pressure requirements can no longer be satisfied The conveying systems are made up of combinations of reducers, straight steel pipes, commonly referred to as "slickline", long or short radius bends or elbows, and rubber hoses. Connections between these components are made with coupling devices that permit assembly and disassembly of the components; and provide secure, sealed joints upon assembly. A shut-off valve may be used at the pumping end of line to stop the discharge flow of concrete composite. Additional accessories include brackets to secure the line, safety chains or slings and cleanout devices. These components permit snaking a placement line throughout a structure, holding it firmly in place to ensure safe operation and discharging of concrete composite precisely where it is needed.

Reverse mode is possible for the mixing shaft and the worm pump The separate delivery worm pump, type 7515 with clamping bar, which is also hydraulically driven, offers delivery performance of up to 15 m; per hour when operating with a mobile mixer. The rotor can be run both clockwise and counter-clockwise. The worm pump consists of a rotor and stator. The entire unit is designed to operate continuously, with a mixing and pumping performance of 8 m; per hour when working under optimum conditions This material is fed via a computer controlled process which measures the weight difference or drop in weight of the binder silo and the aggregate silo separately to determine the amount of material that is being mixed. The accuracy of the weigh cells (3 in total), computer interface, and instrumentation is ±2%. The measuring devices are three weigh cells such as weighing bridges 49.1 that the mixing vessel platform is mounted on. Other weigh cells include weight cell or bridge 40.1, 50.1 or 70.1. Those weigh cells are connected to the computer logic program that monitors and precisely measures the amount of each ingredient being metered into the mixing vessel. There is an additional device, a volume flow meter 64.2 that is used in parallel with the weighing system for the mix water.

There are also a plurality of feed hoses such as a mortar hose reel 66 and a water hose reel 75. Mortar hose reel 66 is designed for approx. 80 meters of NW 50, 40 bar mortar hose. The hose reel is installed above the mixing and pumping unit and is raised hydraulically out of the operating area for the mixing procedure. The hose is also rolled-up hydraulically via a mortar hose hydraulic control or via a water hose hydraulic control 74, which is controlled by control panel 90 or remote 95.

Water hose reel 75 can be designed for 50 meters of flat 3/4A, 10 bar hose fitted into the side of the container.

Figure 14:
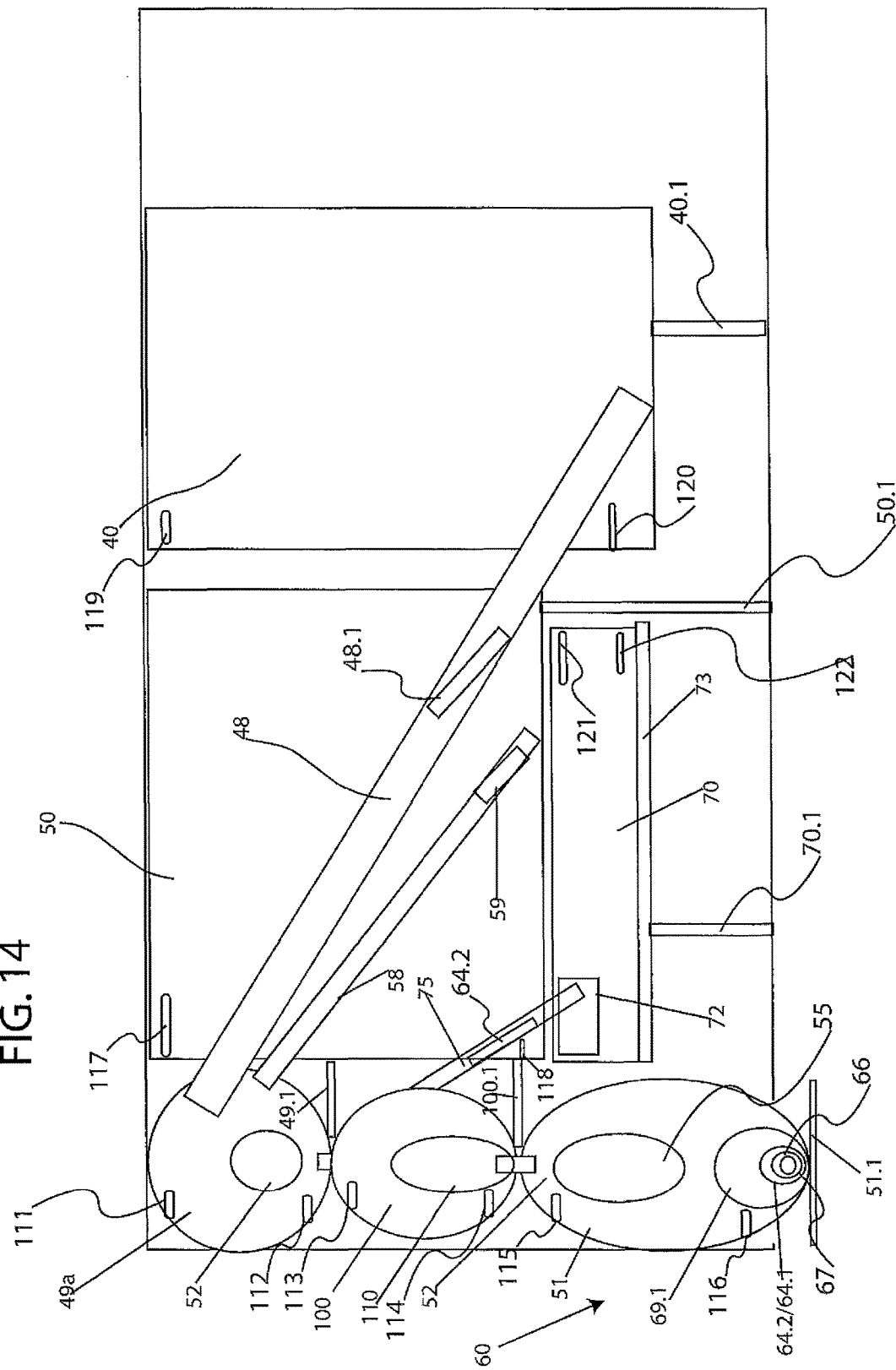
FIG. 14 shows as side cut-away view of another embodiment of a truck

Another embodiment shown in FIG. 14, shows a three tier mixing system which includes mixing container 49a, mixing container 100 (wet mixing container), and pumping container 51 (material reservoir). Mixing container 49 a is similar to mixing container 49 however, this mixing container is only configured to receive dry materials to mix such as dry binder or dry sand from either binder silo 50 or sand silo 40. Thus, mixing paddle 52 is configured to mix the dry material within dry mixer 49 a. Mixing unit 100 is an intermediate mixer which includes mixing paddle 110 and is configured to receive fluid such as water from container 70. This fluid is fed through pipe or feed tube 75 via pump 72. The fluid flows past flow meter 64.2 within this feed tube. This fluid is being pumped into container 100, while screw drives 59 and 48.1 or dispensers, drive the dry material through feed tubes 58 and 48 respectively, and into dry mixing container 49a.

Once the dry material is mixed in dry mixing container 49a it is batch dumped into secondary or wet mixer 100 to be paddle mixed by paddle mixer 110. Next this material is batch dumped into container 51, wherein this material is then mixed by optional paddle mixer 55 and then driven outside of this container by screw drive 69.1 through hose 66. This material then flows past flow meter 68.1. As shown in this drawing, container 51 extends below a bottom of a flatbed of a truck to provide more room for a pump such as pump 69.1

In each of these containers 49a, 100, 51, 50, 40, and 70 there are high low sensors. For example, there is a high sensor 111, and a low sensor 112 inside container 49, a high sensor 113, and a low sensor 114 inside container 100, a high sensor 115 and a low sensor 116 inside container 51, a high sensor 117, and a low sensor inside container 50, a high sensor 121, and a low sensor 122 inside container 70, and finally a high sensor 119 and a low sensor 120 inside of container 40.

Furthermore each of these containers can have weight cells or weight bridges to weight the displacement of material as well. For example, there is a weight bridge 40.1 for container 40, a weight bridge 50.1 for container 50, a weight bridge or weight cell for container 70, a weight bridge or weight cell 49.1 for container 49, a weight bridge or weight cell 100.1 for container 100, and finally a weight bridge or weight cell 51.1 for container 51. These different weight bridges and weight cells along with the high low sensors and the flow meters are used to feed information into a controller, so as to control multiple different batch progressions of material into a hybrid, batch mixed, and continuously pumped slurry set of material.

For example a controller would read the high low sensors 119 and 120 to determine whether more sand mix needed to be added to container 40. In addition the controller such as controller 90 would read high sensor 117 and low sensor 118 to determine whether more binder material needed to be added to binder silo 50.

Controller 90 could also read high sensor 121 and low sensor 122 to determine whether water needed to be added to water container 70. Once the basic raw materials are in the system, the dry materials such as sand and binder are fed from their respective containers 40 and 50, via screw drives 48.1 and 59. This dry material is then batch mixed inside of container 49a via paddle mixer 52. Once this material is mixed for a sufficient period of time, and it reaches high sensor 111, it is fed into container 100 wherein this material is paddle mixed with fluid such as water which is fed from water tank 70. Once this material has been mixed based upon time and once it reaches high level sensor 113 and it is fully mixed based upon a preset mixing time, the mixed material or slurry is dumped into container 51. This material can then be further mixed via paddle mixer 55 and then fed out of the system.

All of these components are coupled to an electronic control panel 90, with four programs, which can be altered by entering a password. The entire unit is controlled and monitored via the electronic control panel, which can operate either in automatic or manual mode. The dosing process is based on the following weight and volumetric values: Aggregate in kilograms; Water in 0.5-liter impulses; Binder in kilograms; Mixing time in seconds. An interface port allows the quantities of material used to be printed or transferred to a laptop computer or data logger (optional). The program is menu-based and shows the respective operating steps on the display.

Figure 15:
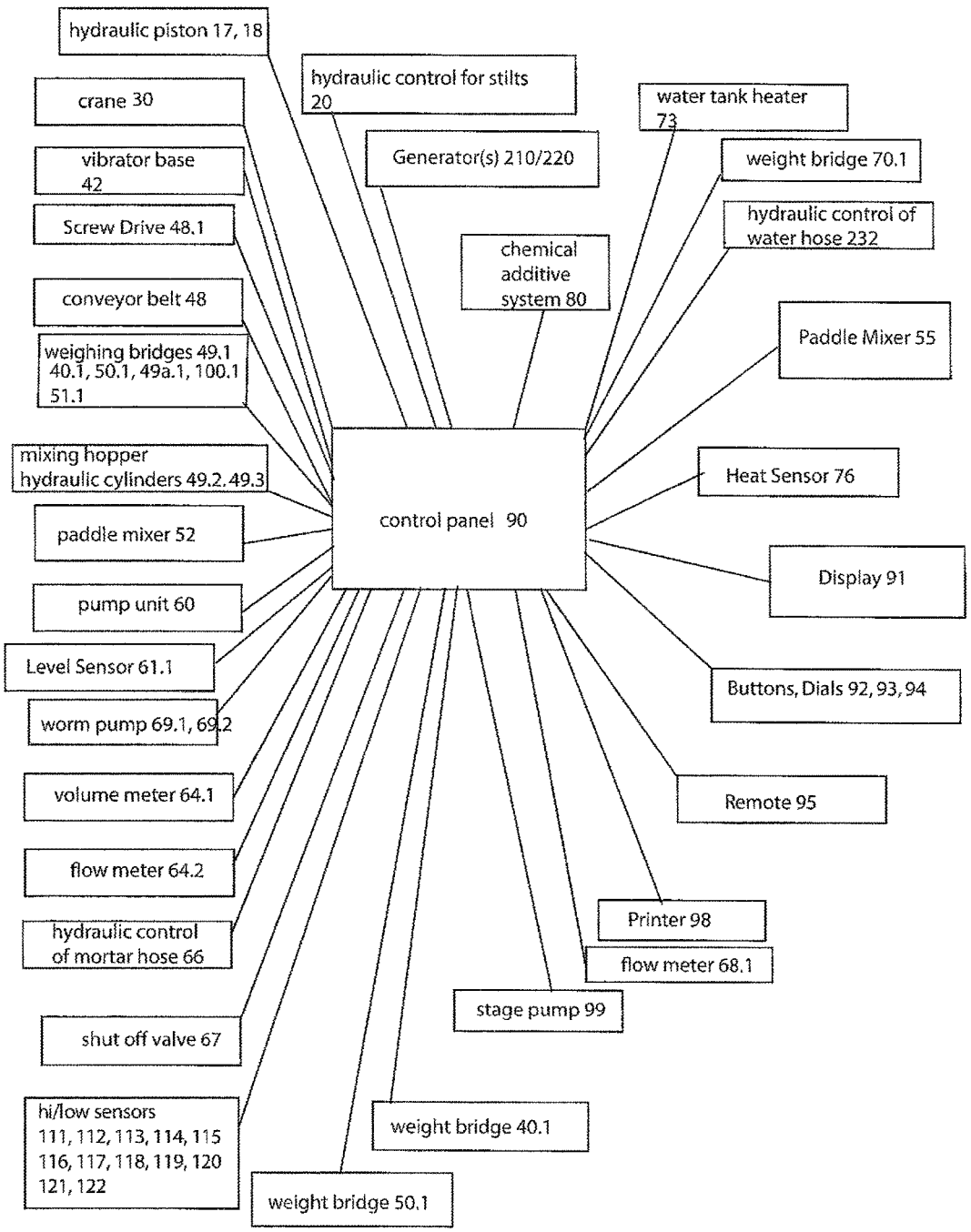
FIG. 15 shows a block diagram of the components controlled by the control panel.
Figure 16:
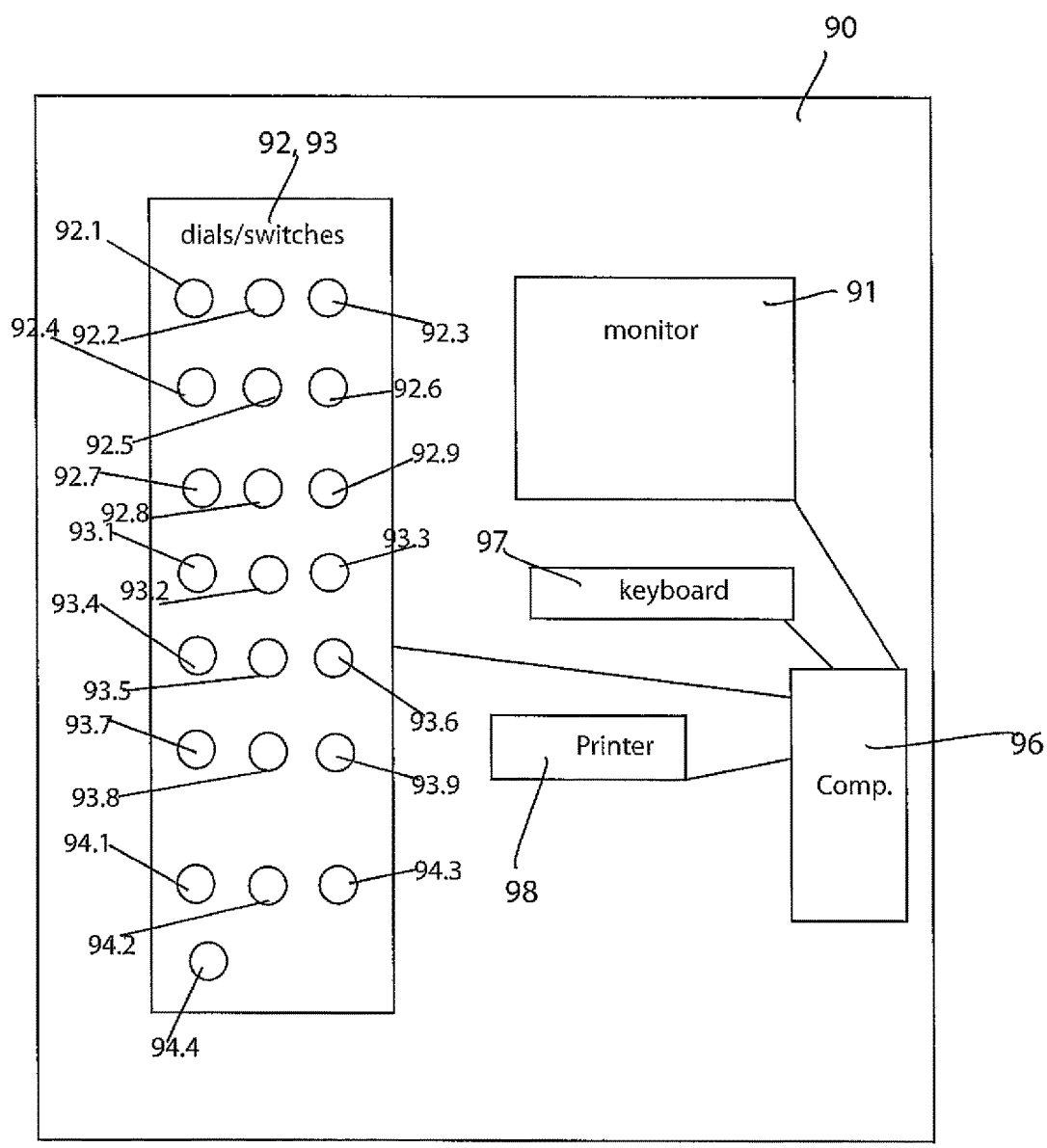
FIG. 16 shows a block diagram of the control panel.

Many of the above elements are controlled by the control panel 90. For example, control panel and the associated computer system is in communication with multiple different components as shown in FIG. 15. For example, control panel 90 is in communication with hydraulic pistons 17 and 18 to control whether the aggregate silo is opened or the binder silo is opened. In addition, control panel also controls crane 30, thereby allowing a user to control the loading of materials entirely from the control panel 90 or from the remote control. The hydraulic control for outriggers 20 is also controlled by control panel 90 as well, allowing a user to adjust the height of extension of each of the outriggers. In addition, outriggers can also be controlled in that their distance from the container is also controlled from control panel 90. Vibrating base 42 is also controlled from control panel 90 which controls the speed or frequency of vibrations in the vibrating base. In addition, the aggregate screw drive 48 is also controlled by control panel 90 which allows a user to pre-program the amount of aggregate is added to the mix in mixing hopper 49. To determine the amount that is added, control panel 90 is also in communication with weighing bridges 49.1 which weigh the mixing hopper 49 to provide constant feedback to the computer system the amount of material being fed into mixing hopper 49. The hydraulic cylinders 49.2 and 49.3 which control the height of the mixing hopper 49 are also controlled by control panel 90.

Control panel 90 also controls paddle mixer 52 which mixes the components inside of mixing container or hopper 49. Control panel 90 is also in communication with pump unit 60 which is essentially the hydraulic unit for the system. Control of this system utilizes the control of the power generated by pump unit 60 as well as which valves to use in valve bay 63.

Control panel 90 also determines the level of water added to the system by both weighing the amount of water added to mixing container 49, as well as reading the amount of water added via either a volume meter 64.1 or a flow meter 64.2 contained in the water feed tube 79. This control panel also controls the hydraulic control of mortar hose 66, enabling the extension of the hose or the rolling up of this hose as well. This control panel also controls a shut off valve 67, and a hi low sensor as well. The shut off valve 67 is located in the material reservoir 51, whereas hi/low sensor is also located inside of material reservoir 51. Shut off valve 67 is configured to shut off the discharge of the concrete slurry from the slurry hose, while the hi-low sensor 68 is configured to inform control panel 90 of the level of material inside of material reservoir 51. The control panel is also configured to read the readings of the weight bridges 49.1, 50.1, 60.1, and 70.1 and use these readings against any flow control valves or flow meter 68.1. This flow meter would then determine the proper flow based upon the amount of material being continuously fed into containers 49, 100 or 51. Thus, the screw drives feeding either the binder or the sand from either silo 40 or 50 can be either increased or decreased depending on the read flow rate of flow meter 68.1. The controller or control panel 90 would read the flow rate, and determine the amount of material being dispensed by subtracting the weight from the weight bridges 70.1, 50.1 49.1, or 40.1 to determine how to alter the associated screw drives Control panel 90 also controls generator 66 which provides additional power to user's in the field. Other features that are also controlled are the water tank heater 73, as well as the hydraulic control of water hose 74. This allows the water hose to be unfurled hydraulically or even more importantly, hydraulically reeled into the container.

Control panel 90 also controls heat sensor 76 which determines the heat level of water tank 70, as well as chemical additive system 80.

Control panel also controls the display 91 which can be a video screen such as a LCD monitor, a series of buttons or dials 92, 93, or 94. A remote control 95 can also be used to control control panel 90, by remotely signaling information back and forth from control panel 90.

Control panel 90 can also be used to control printer 98, as well as stage pump 99. In this case, stage pump 99 can be configured to wirelessly transmit signals back and forth to control panel 90 to allow control panel 90 to control the pumping action of stage pump 99.

The electronic control panel 90 (See FIGS. 15 and 16) includes a manual control which includes control of binder dosage, aggregate dosage, water dosage. The panel can also control a mixer hatch open/close, high-pressure cleaner on/off, additive dosage. The control panel also has a display 91 and dials or buttons 92. For example, there is a main switch 92.1, a pause switch 92.2, further dosage after last mix switch 92.3 which stops after transport of remaining material. Another switch 92.4 is a Control lamp high-pressure cleaner "on". There is also a Data-transfer port 92.5, a delivery worm pump "back" switch 92.6, auto mode for delivery worm pump switch 92.7, manual mode for delivery worm pump switch 92.8, delivery worm pump "off" switch, 92.9. There is also a control lamp for mixer filling level 93.1, a mixer hatch "open" or lock switch 93.2, an indicator for Mixer—automatic 93.3, mixer stop switch 93.4, manual mixer switch 93.5 a button or dial 93.6 for Mixer input 1/1, 1/2, 1/4. The preset mix ratio will be halved or quartered accordingly. Motor "start/stop" button 93.7; a fuel gauge 93.8; a battery-voltage indicator 93.9; an alternator charging-control lamp 94.1 an oil pressure-control lamp 94.2; an air filter-control lamp 94.3; a motor coolant-control lamp 94.4.

The remote control 95 has the following functions: 1) Start/Stop: wherein the delivery procedure is immediately interrupted (delivery worm pump remains stationary). 2) Delivery worm pump control which controls the speed +/−: In this case, the pumping performance infinitely increased or decreased accordingly, 3) Water increase or decrease, +/−: Water dosage increased or decreased by 0.5 liter per key press accordingly. The alterations in the water dosage only take effect for the subsequent mixture. The pre-selected material of approx. 400 liters in the mixing hopper and approx. 900 liters in the delivery hopper (1300 liters) are not taken into account. 4) Motor start/stop: this includes Emergency stop: The complete unit is shut down (motor is switched off) 5) Data transfer Data logger (optional): With the use of a data logger, the following additional data per mixture can be transferred; Mixture no., date and time, water, binder, aggregate, mixing time, crew. This remote control can be in the form of a wireless remote control, which can communicate in any known manner such as through 802.11x type communication, through cellular communication, satellite communication or any other known type of communication.

The remote control can be used to control the control panel through a virtual desktop connection, through Ethernet access or any other type of internet access. The control of the control panel can either be in a partial form such as through a limited set of controls or an entire remote control, which controls both the controls but also troubleshoots any software or hardware problems, as well as controlling the application of building materials.

Control panel 90 can also include a computer 96 such as a standard personal computing which uses any known operating system such as windows based or Linux based operating systems, which are particularly controlled to mix and deposit mixed compound described above. There is also a keyboard 97, which is used to allow a person to also put in commands controlling the program as well. There is also an optional printer 98 which is in communication with control unit 90. The printout can include the following statistics or indications: 1) name of client; 2) address of client; 3) location of client; 4) Printing date of report; 5) Printing time of report; 6) Discharge-start date; 7) Discharge-start time; 8) Crew; 9) Produced quantity in kg; 10) Produced quantity with water in kg; 11) Number of mixtures; 12 Produced quantity without water in kg; 13) Produced quantity in m; 14) Produced height: in cm; 15) Area in m5; 16) Aggregate without residual moisture in kg; 17) Residual moisture in % (input value); 18) Total water in kg; 19) Aggregate with residual moisture in kg; 20) Water consumption in kg; 21) Number of mixtures; 22) Area in m5; 23) Binder in kg.

Ultimately, the device allows for a container to be delivered using a truck, wherein the container can be deposited at a construction site, and wherein this container can then be removed from the back of the truck using the outriggers such as outriggers 20. In this case there can be any number of hydraulically controlled outriggers, but here as shown are four outriggers 21, 22, 23, and 24 which can be telescoped or retracted into a stilt chamber such as chambers 25 and 26. As shown in FIG. 9, these outriggers are controlled by the control panel or remote control. Once the container is removed from the back of the truck it can be connected to a water source and then turned on. Alternatively if a water source is not available, water can be used from the water tank to initially mix the building materials. The truck can then be removed from the job site and then taken to pick up another container and then deliver another container to a new job site.

The concrete composite can be applied across a wide array of different weather situations. For example, the concrete composite can be applied during cold weather wherein the truck contains an on board water heater fur use during cold conditions. The concrete composite can be stored inside of a heated building until prior to staging on a jobsite. The truck itself can be parked inside of a heated building and protected from damage by freezing conditions.

During hot weather installations, the installation can be scheduled at other than normal time installations such as outside of the heat of the day. Special chemical additives can be used from the chemical dosing pump which provides greater tolerances for applying the mixture during these extreme weather conditions.

Figure 17:
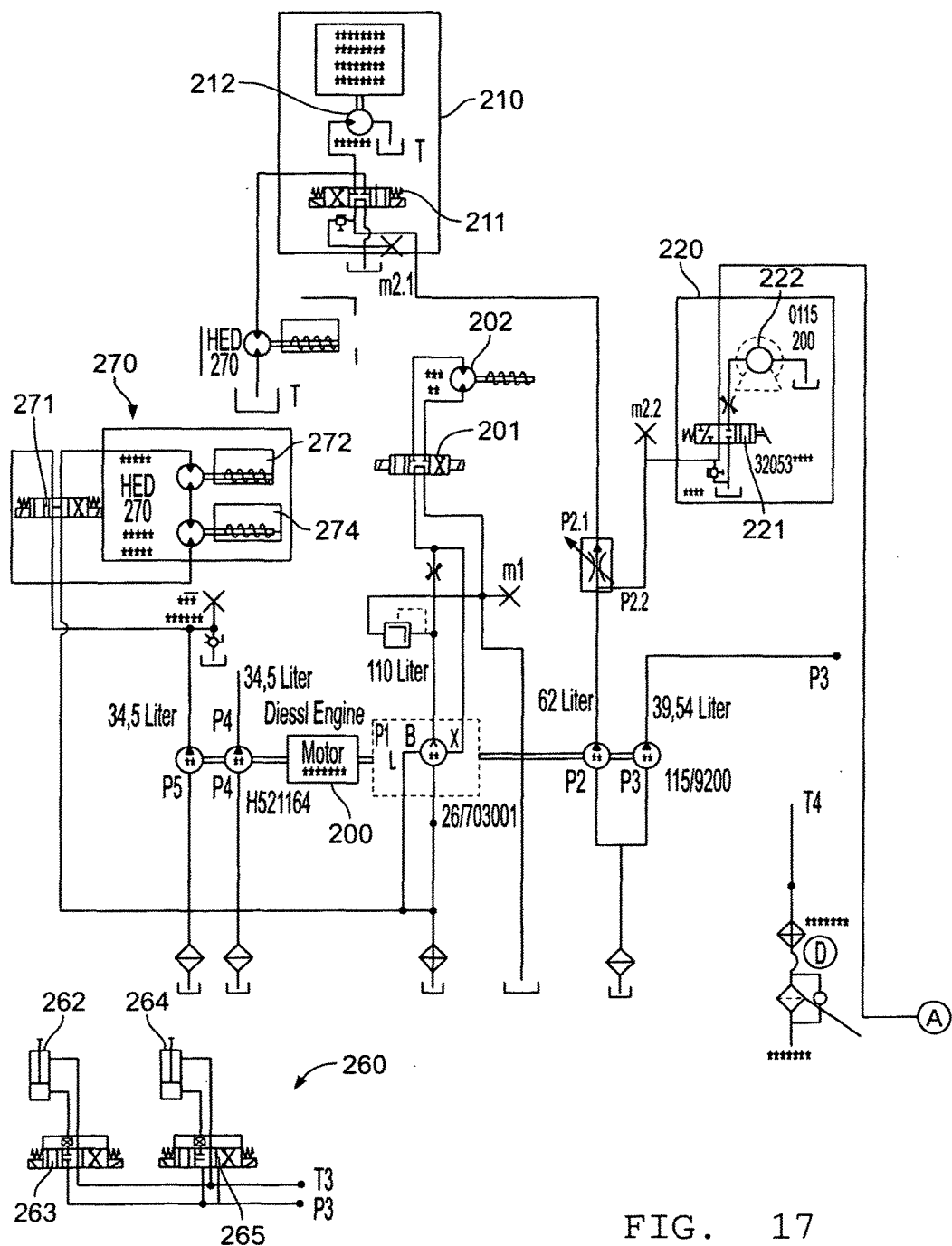
FIG. 17 shows a schematic block diagram of the pneumatic system for at least one embodiment of the truck.
Figure 17:
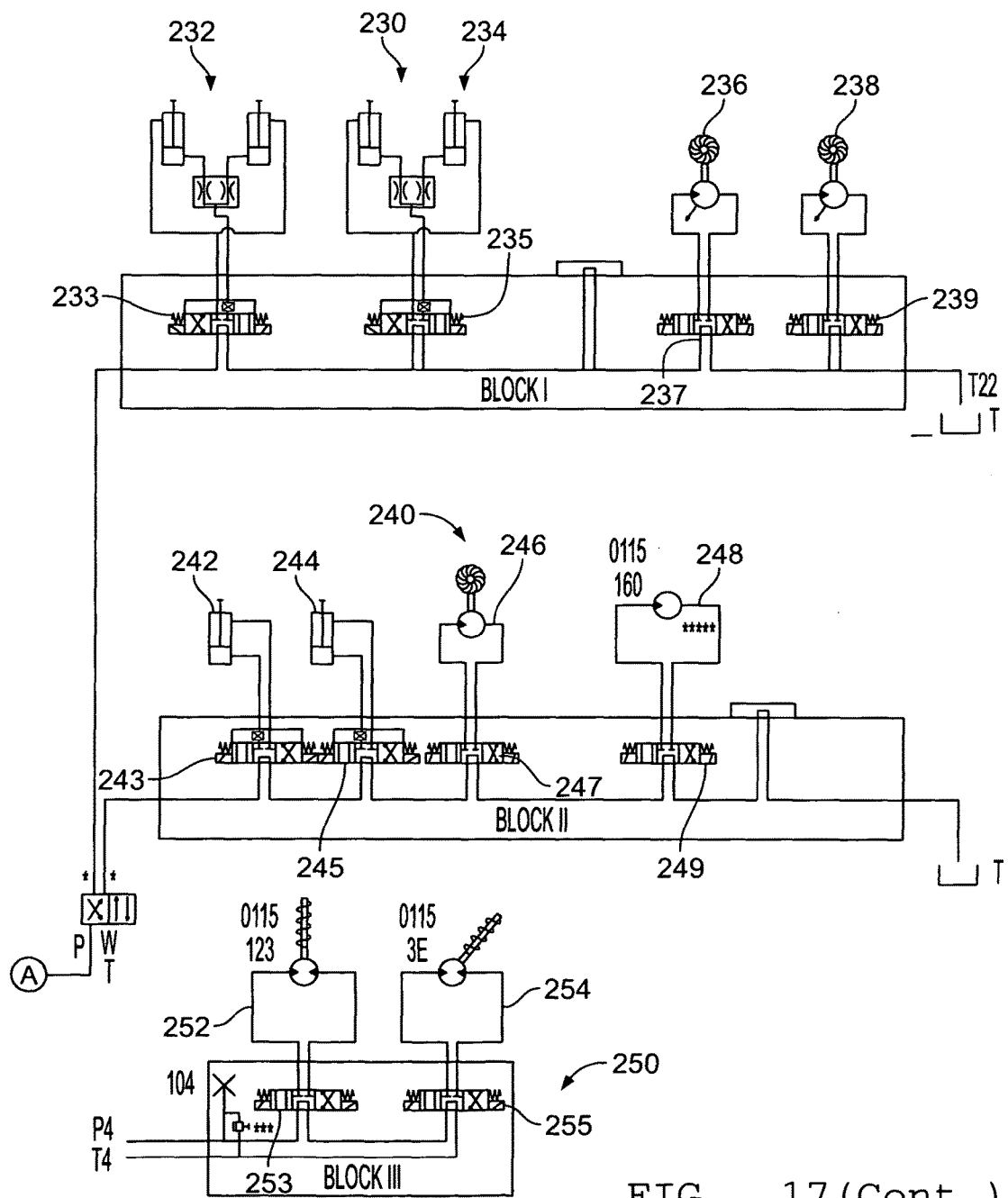

As shown in FIG. 17 there is a hydraulic system which is configured to control the different components on a single truck. For example, this hydraulic system can rely on power from a diesel engine or from separate generators. For example, there is a diesel engine 200 along with additional generators 210 and 220. Diesel engine is configured to drive a valve system 201 which is configured to control a pump 202. Additional generator 210 also includes a valve system 211 as well as a generating component 212. In addition, additional generator 220 can also include a valve system 221 as well as a generating component 222. The diesel engine 200, the first additional generator 210, and the second additional generator 220 are configured to operate different hydraulic blocks. For example, there is a first hydraulic block 230, a second hydraulic block 240, a third hydraulic block 250. The first hydraulic block 230 includes a hydraulic control for a hose reel 232 having a valve system 233, a mixing vessel lift 234, including a valve system 235, a first sand vibrator 236, including a valve system 237, and a second sand vibrator 238 including a valve system 239. The associated valve systems are configured to control the pressure within each of their associated components.

The second block 240 includes a bottom lid mixing vessel 242 having a valve system 243. There is also a top lid mixing vessel 244 having a valve system 245. There is also a water pump 246 which is coupled to valve system 247. There is also a binder screw 248 hydraulic system controlled and powered by a valve system 249.

There is also a third block 250 which includes a hydraulic control or a power for a binder screw 252, this device controlled by a valve system 253. Furthermore, there is a sand screw hydraulic control 254 which is controlled by a valve system 255.

There is also another section 260 which includes a sand lid 262, which includes a valve system 263. This additional system includes a binder lid 264 which has an associated valve system 265. Both of these device are powered by either the diesel engine 200 and/or one of the multiple different generators 210 and/or 220.

There is also another set of devices 270 which includes a mixer 272 and a conveyor 274. Mixer 272 includes an associated valve system 271, while conveyor 274 includes a valve system 273 which is configured to control the pressure inside of the hydraulic system regarding conveyor 274.

In at least one embodiment, there is a system for depositing building materials comprising: a motor vehicle; a container comprising a material depositing system; and at least one means for removing the container from the motor vehicle. In this case, there is a means, for removing the container wherein the means comprises at least one stilt for lifting the container off of the motor vehicle. In one embodiment, the device can, further comprise at least one crane. In another embodiment the device can also comprise at least one pump, for pumping building materials from the container to a deposit area. In another embodiment, the device can also comprise a control panel for monitoring the deposit of material and for controlling the means for removing the container from the motor vehicle. At least one embodiment can further comprise a remote control in communication with the control panel for controlling the deposit of building material. At least one embodiment can further comprise a stage pump for providing additional pumping pressure to pump additional material to a deposit area. At least one embodiment can further comprise at least one stilt comprises a hydraulically controlled stilt positioned outside of a flatbed of a motor for lifting the container off of the flat bed. In at least one embodiment the at least one stilt comprises at least four outriggers coupled to the container, for lifting the container off of a flatbed of a motor vehicle, to allow the motor vehicle to leave the container on a job site.

There is also a system for depositing building materials comprising, a motor vehicle; a container comprising a material depositing system, the material depositing system comprising at least one silo and at least one pump for pumping material disposed in the at least one silo; and at least one lifting system for removing the container from the motor vehicle, the lifting system comprising at least one stilt configured to lift the container off of the motor vehicle and configured to deposit the container on a ground surface after the motor vehicle moves away from the container.

There is also a process for depositing building materials comprising: providing a base slab floor; bull floating the base slab floor; inspecting the base slab floor for debris; utilizing a measuring device to survey height dimensions; applying an adhesive intermediary; inserting plastic pins with respect to survey measured points; mixing a self leveling compound; pumping the mixed compound through a conveying system; and smoothing the mixed compound to create a uniform surface and floor which is cured. At least one embodiment can further comprise the step of providing a stage pump which allows additional pumping of the mixed compound. In at least one embodiment, the mixed compound comprises a premixed selection of binder, limestone and silica, non portland cement based cementitious underlayment compound. In at least one embodiment, the mixed compound comprises any one of calcium aluminate cement, fly ash, aggregate, polymer, and superplasticizer At least one embodiment further comprises the step of curing the mixed compound to form a permanent alkali barrier to the concrete. At least one embodiment further comprises the step of curing the mixed compound to it a minimum of 4,000 PSI. At least one embodiment further comprises the step of hydraulically controlling a hose reel to roll up a hose reel.

Accordingly, while a few embodiments of the present invention have been shown and described, it is to be understood that many changes and modifications may be made thereunto without departing from the spirit and scope of the invention as defined in the appended claims.

What is claimed is:

1. A portable building dispensing system configured to dispense a mixed building material comprising dry material and a fluid, the system comprising:
   at least one dry container for holding the dry-material;
   at least one additional dry container for holding dry material; at least one dispenser for dispensing the dry material;
   at least one mixing container for mixing a fluid with said dry material;
   at least one mixer disposed in said mixing container for mixing said fluid with said dry material;
   at least one pump container for receiving said mixed material in a batch distribution;
   at least one pump configured to dispense material from said at least one pump container;

at least one weight cell configured to measure an amount of material dispensed from said at least one dry container of dry material;

at least one flowmeter configured to measure an output from said pump container dispensed by said pump;

at least one controller configured to control an amount of dry material dispensed from said at least one dry container, based upon said output from said pump, and wherein the system is configured to mix multiple batches of said mixed material;

at least one additional dispenser, and at least one additional weight cell, wherein said dispenser is configured to dispense a first type of dry material from said at least one dry container, and said at least one additional dispenser is configured to dispense an additional dry material, and wherein said at least one additional weight cell is configured to weigh an amount of additional dry material dispensed from said at least one additional container; and at least one crane, at least one hose reel, at least two container openers, and at least one hydraulic system configured to drive said crane and said at least two container openers;

wherein said at least one hydraulic system comprises at least one generator and at least one additional generator for creating additional pressure in the system and wherein the at least one hydraulic system is configured to drive said at least one dispenser, said at least one mixer, said at least one pump, and-said at least one hose reel.

2. The system as in claim 1, wherein said at least one dry container is configured to contain a first type of dry material and said at least one additional container is configured to contain at least an additional type of dry material.

3. The system as in claim 1, further comprising at least one vibration mechanism configured to vibrate at least of said dry container and said at least one additional container.

4. The system as in claim 3, wherein at least one of said at least one dry container and said at least one additional container is configured to contain sand.

5. The system as in claim 3, wherein at least one of said at least one dry container and said at least one additional container is configured to contain binder.

6. The system as in claim 1, wherein said at least one dispenser and said at least one additional dispenser each comprise a screw drive.

7. The system as in claim 1, wherein said mixer comprises at least one paddle.

8. The system as in claim 1, wherein said pump comprises at least one screw drive.

9. The system as in claim 1, wherein said controller comprises at least one computer and further comprises at least one touch screen for controlling said at least one computer.

10. The system as in claim 1, further comprising at least one vehicle for moving the system from a first location to a second location.

11. The system as in claim 1, further comprising at least one dry mixer, said at least one dry mixer being disposed to receive dry material from said at least one dry container and said at least one additional container, and being configured to dispense said dry material to said at least one mixing container.

12. A portable building dispensing system configured to dispense a mixed building material comprising a first material and a fluid, the system comprising:

at least one container for holding the material;

at least one dispenser configured to dispense the material;

at least one mixing container for mixing a fluid with said material;

at least one mixer disposed in said mixing container for mixing said fluid with said material;

at least one pump container for receiving said mixed material;

at least one pump configured to dispense material from said at least one pump container; and at least one crane, at least one hose reel, at least one container opener, and at least one hydraulic system configured to drive said crane and said at least one container opener;

wherein said at least one hydraulic system comprises at least one generator for creating pressure in the system and wherein the at least one hydraulic system is configured to drive said at least one dispenser, said at least one mixer, said at least one pump, and-said at least one hose reel.

13. The portable building dispensing system as in claim 12, further comprising:

at least one flowmeter configured to measure an output from said pump container dispensed by said pump; and at least one weight cell configured to measure an amount of material dispensed from said at least one container of material.

14. The portable building dispensing system as in claim 12, further comprising at least one additional container for holding substantially dry material.

15. The system as in claim 14, wherein said at least one container is configured to contain a first type of material and said at least one additional container is configured to contain at least an additional type of material.

16. The system as in claim 14, further comprising at least one vibration mechanism configured to vibrate said at least one additional container.

17. The system as in claim 14, further comprising at least one vibration mechanism configured to vibrate said at least one container and said at least one additional container.

18. The system as in claim 14, wherein at least one of said container and said at least one additional container is configured to contain binder and wherein said at least one dispenser comprises a pump.

19. The system as in claim 14, wherein at least one of said at least one container and said at least one additional container is configured to contain binder.

20. The system as in claim 14, further comprising at least one base container and at least one cab coupled to the at least one base container wherein said at least one base container is configured to house said at least one container and said at least one additional container, and wherein said at least one container and said at least one additional container each comprise openings, and wherein the system further comprises at least one slicer positioned above at least one of said openings, said at least one slicer configured to open at least one bag of material.

21. The system as in claim 20, wherein said at least one slicer is a substantially arrow shaped slicer.

22. The system as in claim 12, wherein said at least one mixer comprises at least one paddle and wherein said at least one pump comprises at least one screw drive.

* * * * *